May 7, 1940.  L. S. HARRISON ET AL  2,199,541
DATA TRANSCRIBING MACHINE
Filed March 30, 1937  12 Sheets-Sheet 2

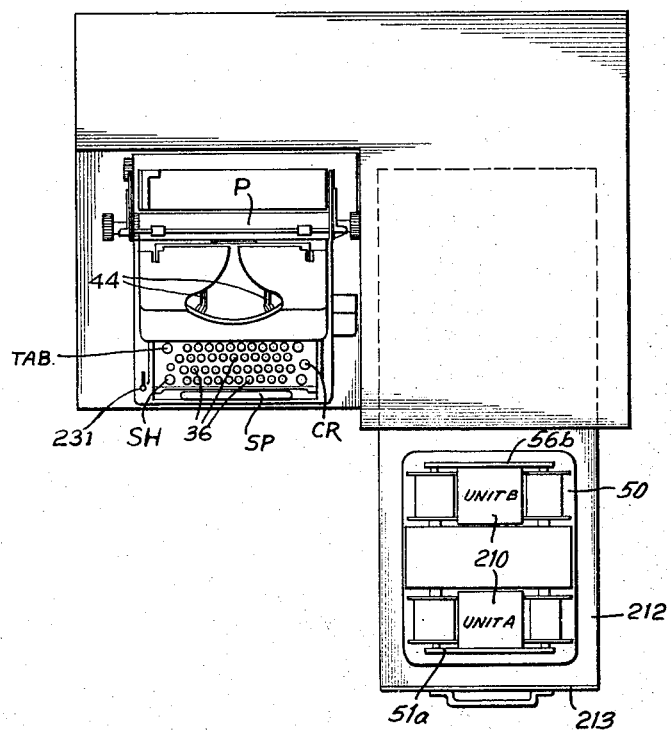
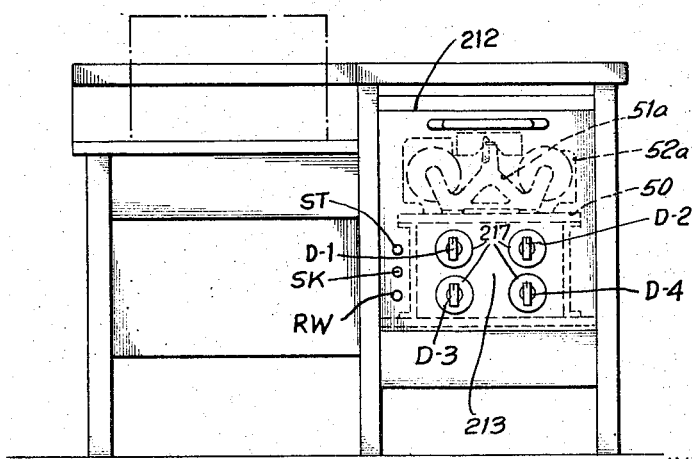

INVENTORS
Laurence S. Harrison
Edward J. Rabenda
BY
W. M. Wilson
ATTORNEY

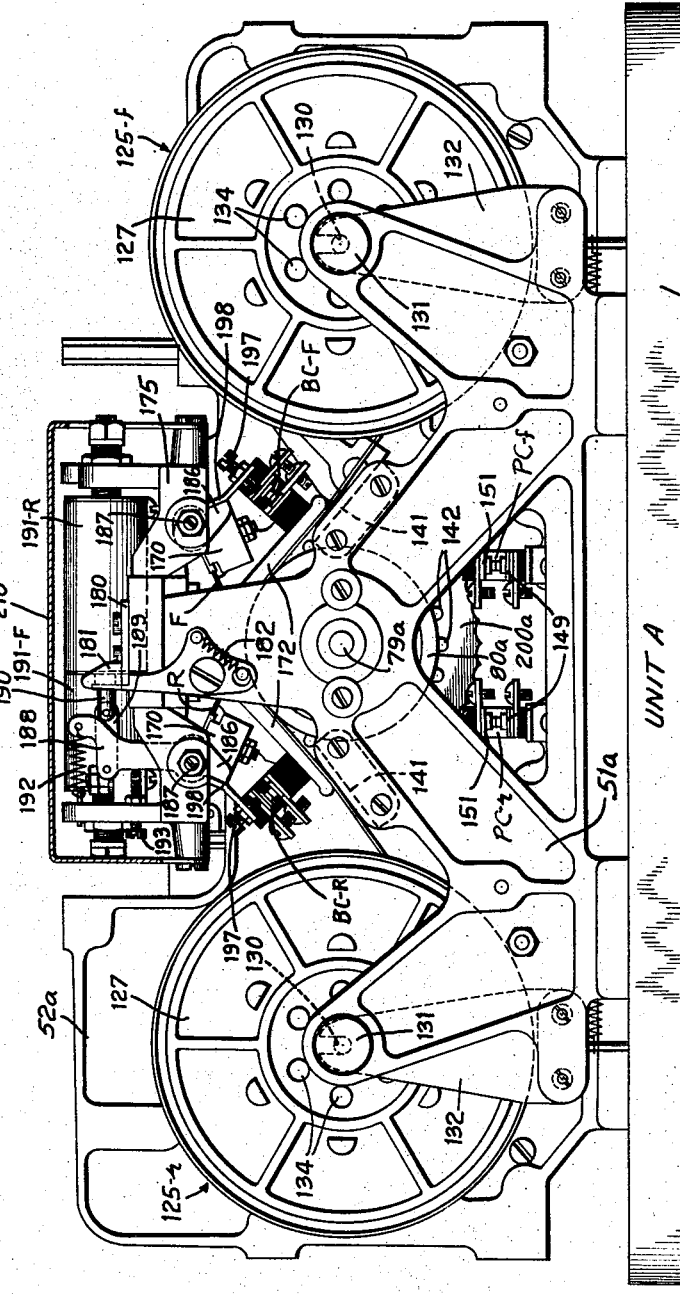

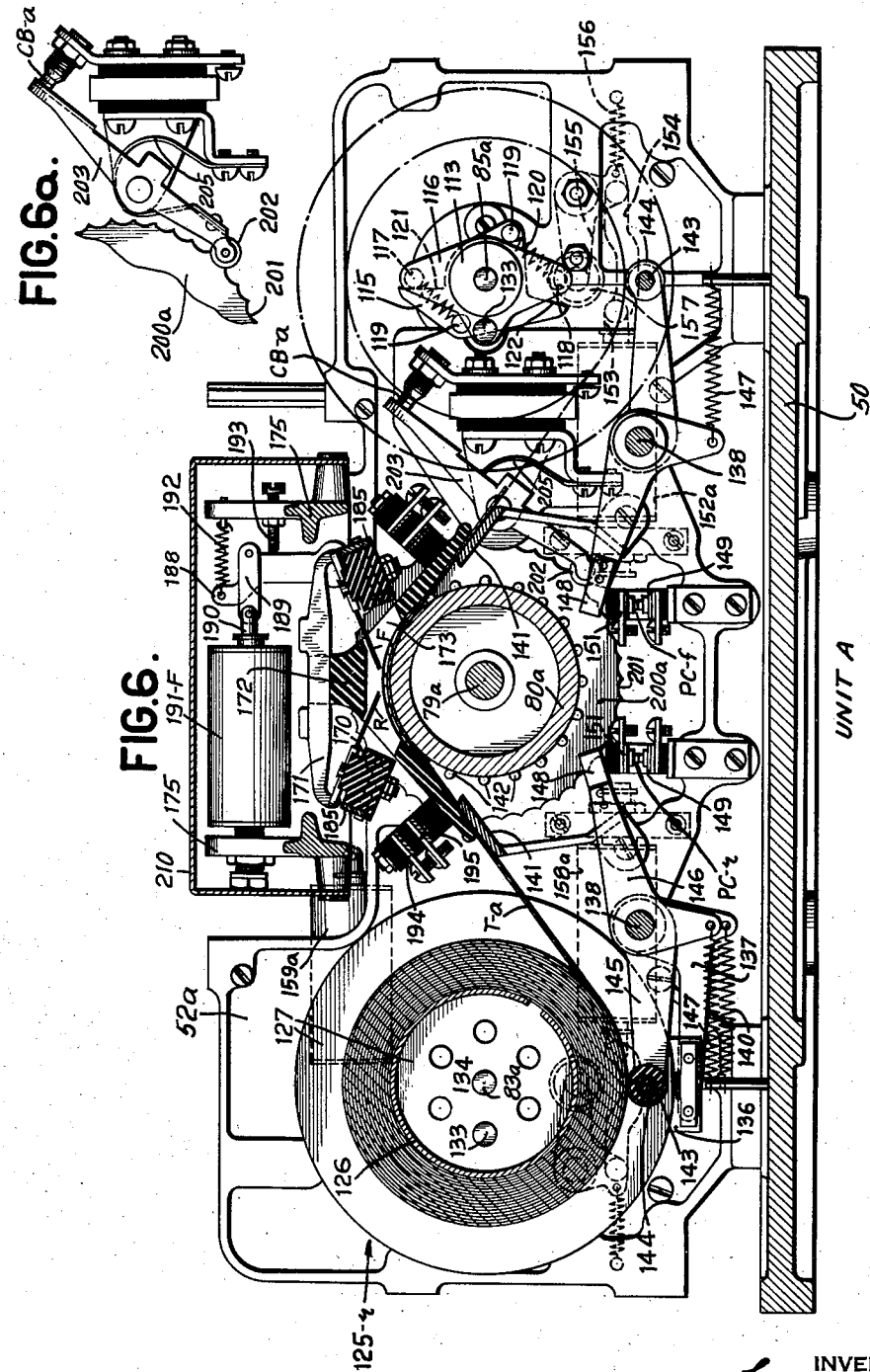

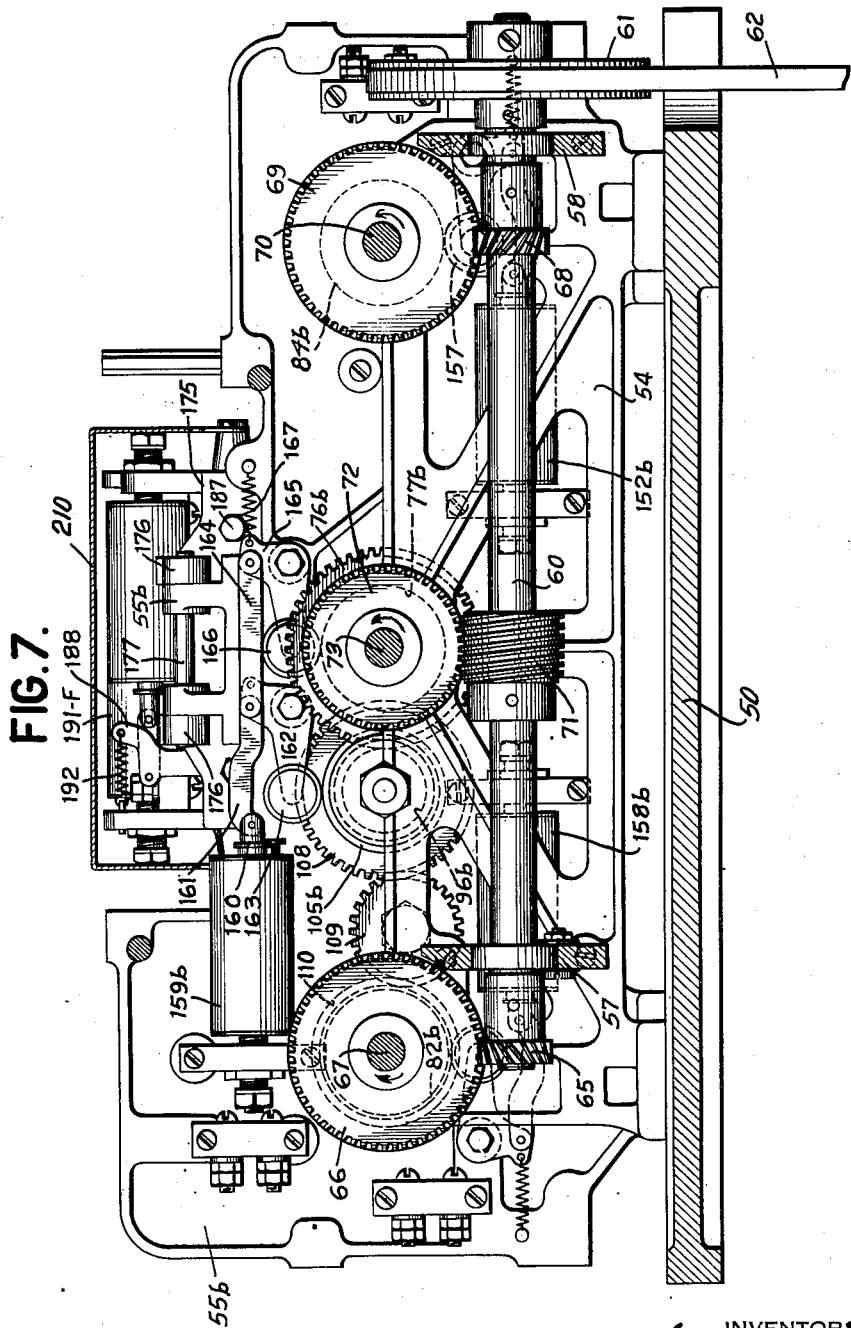

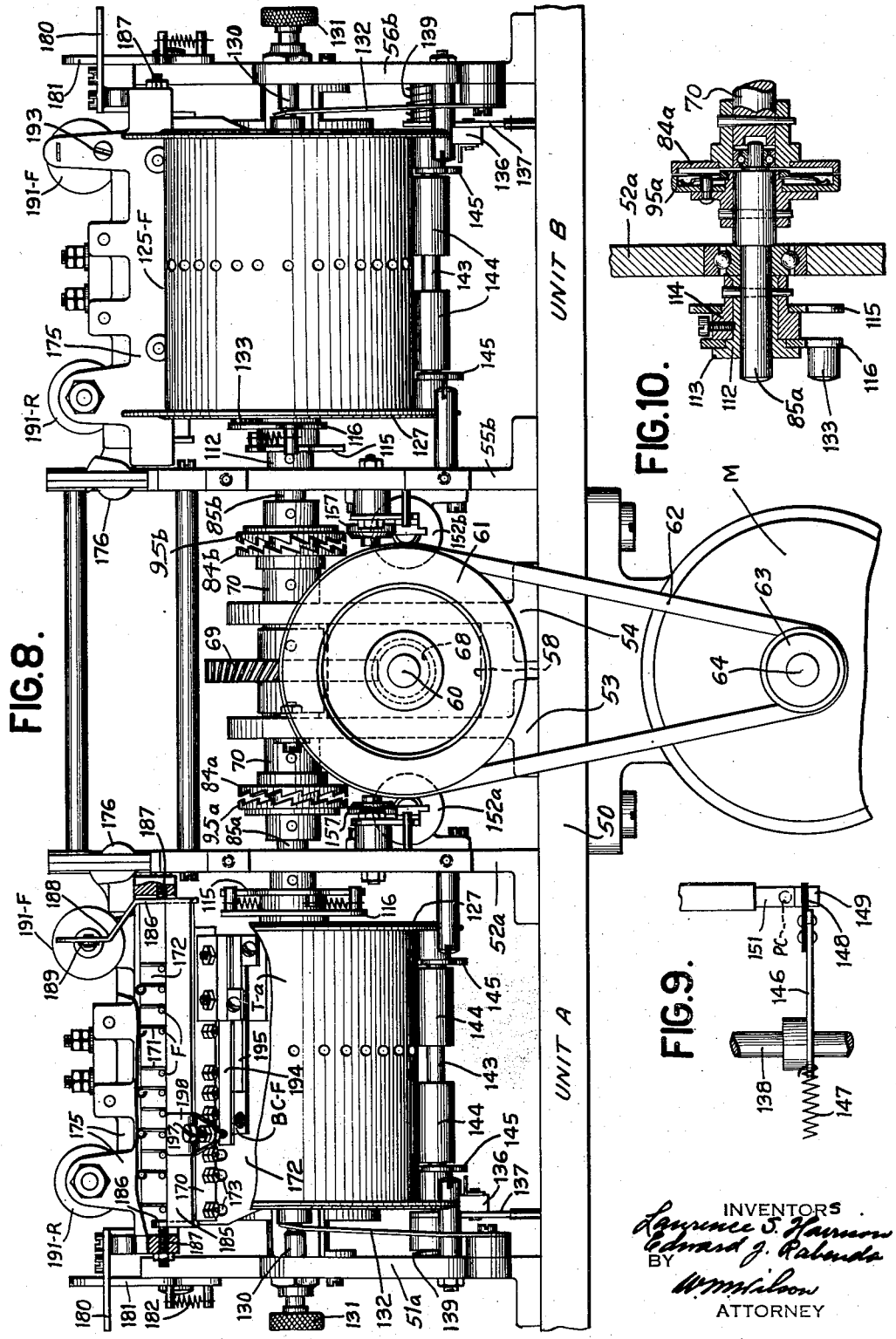

May 7, 1940.  L. S. HARRISON ET AL  2,199,541
DATA TRANSCRIBING MACHINE
Filed March 30, 1937  12 Sheets-Sheet 7

INVENTORS
Lawrence S. Harrison
Edward J. Rabenda
BY
ATTORNEY

May 7, 1940.   L. S. HARRISON ET AL   2,199,541
DATA TRANSCRIBING MACHINE
Filed March 30, 1937   12 Sheets-Sheet 8

INVENTORS
Laurence S. Harrison
Edward J. Rabenda
BY
W. M. Wilson
ATTORNEY

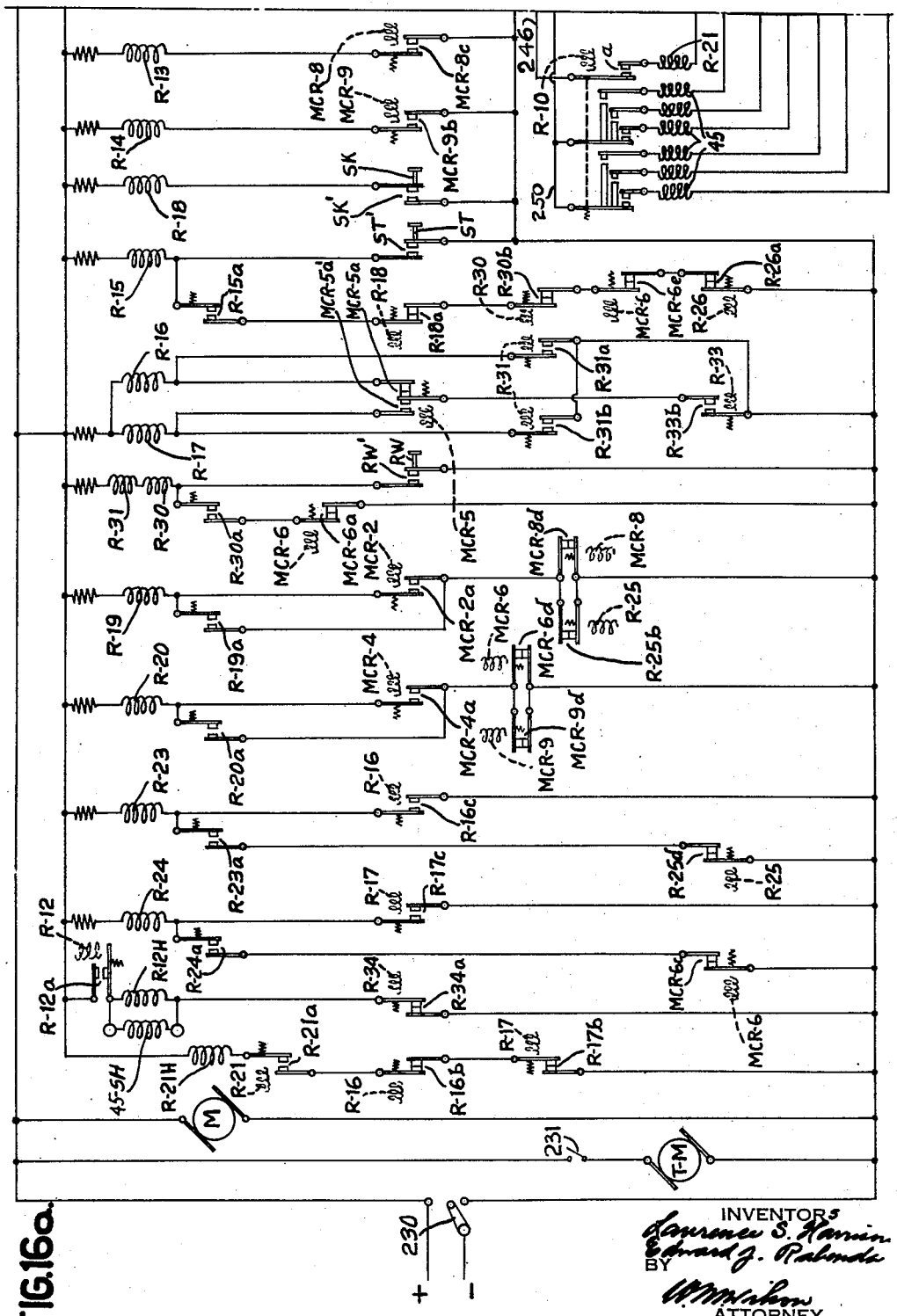

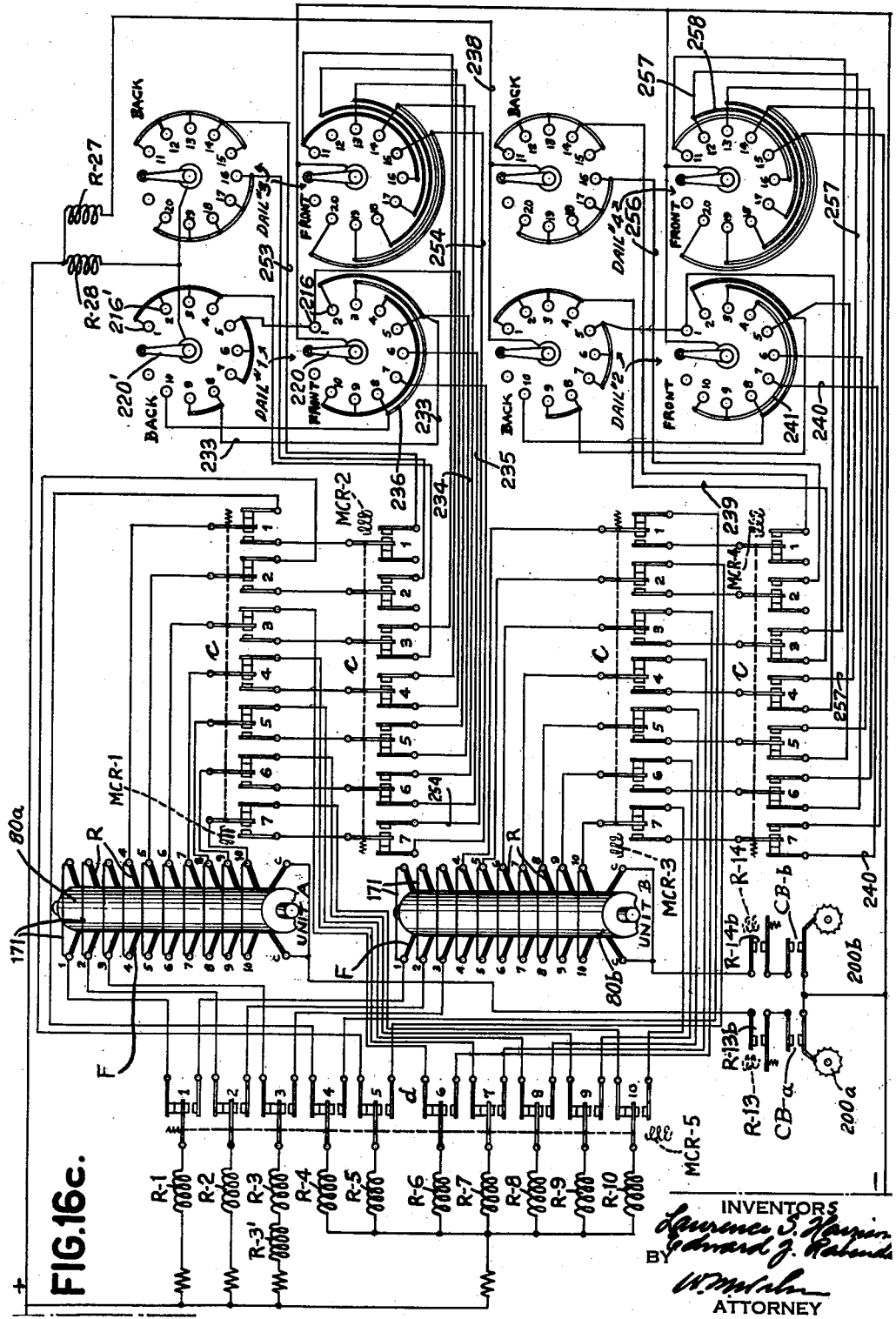

Patented May 7, 1940

2,199,541

UNITED STATES PATENT OFFICE 2,199,541

DATA TRANSCRIBING MACHINE

Laurence S. Harrison, Hartsdale, and Edward J. Rabenda, Binghamton, N. Y., assignors to International Business Machines Corporation, New York, N. Y., a corporation of New York Application March 30, 1937, Serial No. 133,762

30 Claims. (Cl. 197—20)

This case relates to a machine for automatically transcribing information, and particularly to a typewriter controlled by a perforated record tape.

The general object of the invention is to provide improved means for controlling a transcribing apparatus, such as a typewriter, by means of coded designations, as by representations on a record tape.

Further, the object is to increase the flexibility and range of utility of such machines as were previously known for automatically transcribing data from a source, such as a perforated tape.

More specifically, an object is to provide means for effecting variable selections of matter to be automatically transcribed.

Another object is to provide a plurality of sources of information to be transcribed, with means for operating the transcribing apparatus under control of information variably selected from any of the sources.

Still another object is to provide an improved means for sensing coded data on a record sheet for controlling the transcribing apparatus.

It is also an object to provide means for selecting information to be transcribed from one record sheet while transcribing information from another record.

It is a further object to provide means for selecting a record form, under control of its own form identifying designation, for controlling operation of the transcribing apparatus.

Another object also is to move a record tape to a predetermined position after a certain number of record forms on the tape have been transcribed.

Other objects will appear from the following parts of the specification, and from the drawings, in which:

Fig. 1 is a plan view of the composite typewriter and robot machine.

Fig. 2 is a front view of the composite machine.

Fig. 4 is a section on lines 4—4 of Fig. 3.

Fig. 5 is a detail of the outer, releasable support and center bearing for a data tape spool.

Fig. 6 is a section on lines 6—6 of Fig. 3.

Fig. 6a is a detail of a circuit breaker lever.

Figure 3:
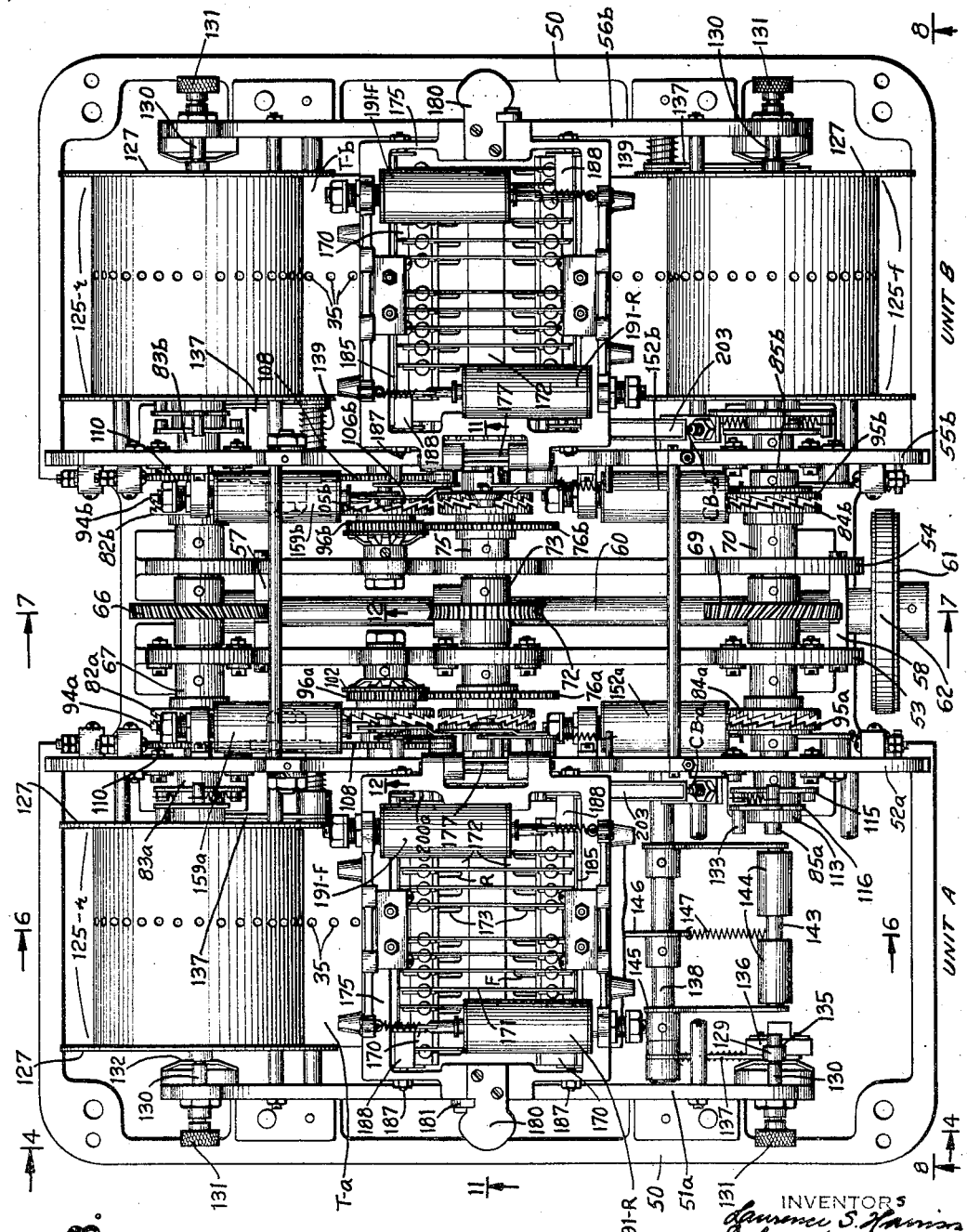
Fig. 3 is a plan view of the robot with the housing removed.

Figs. 7 and 8 are sections along lines 7—7 and 8—8, respectively, of Fig. 3.

Fig. 9 is a detail plan view of a switch for sensing depletion of the designation-punched portion of the tape with respect to a tape spool.

Fig. 10 is a section through a spool-drive assembly.

Figure 11:
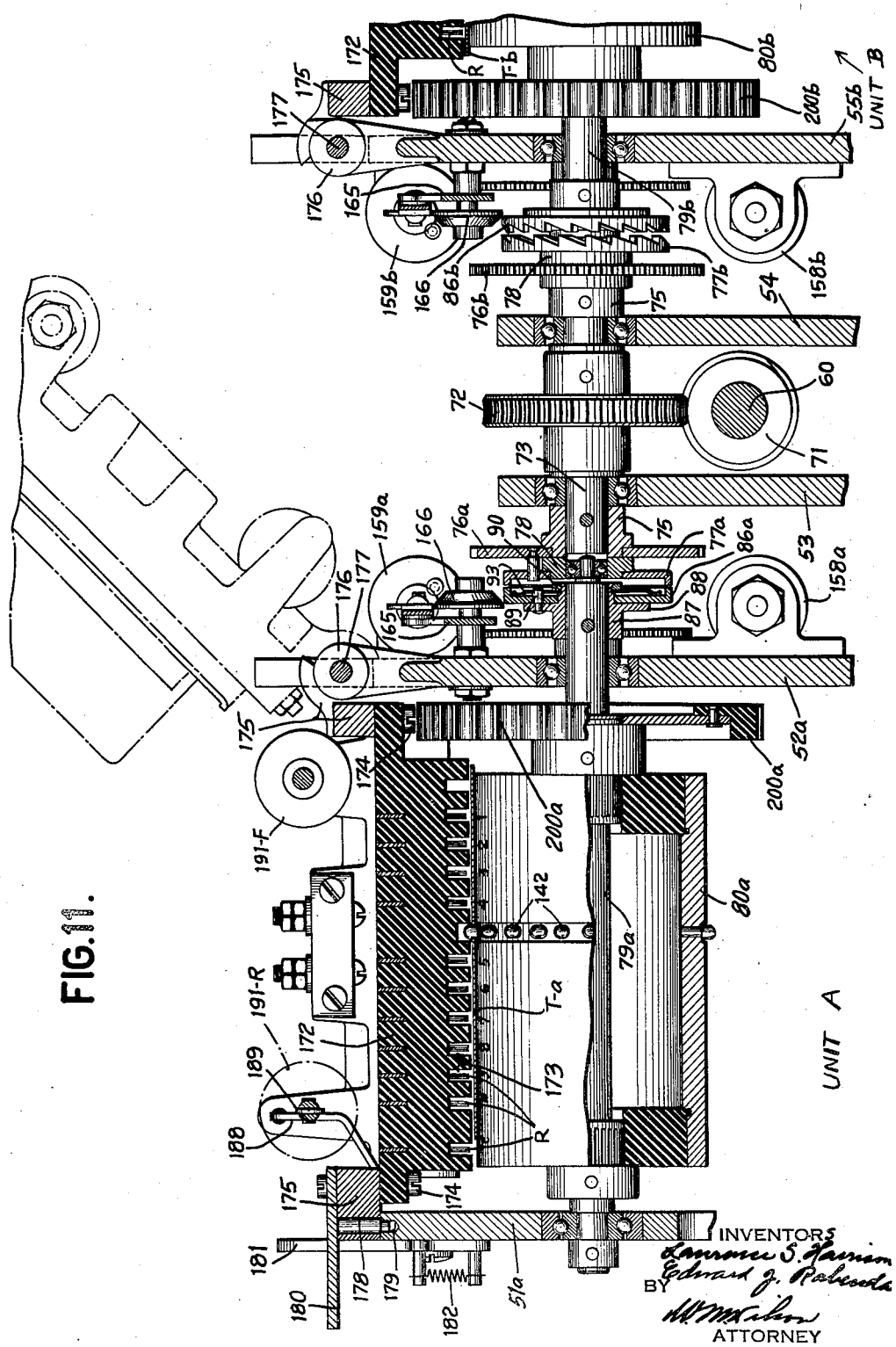

Fig. 11 is a section on lines 11—11 of Fig. 3.

Figure 12:
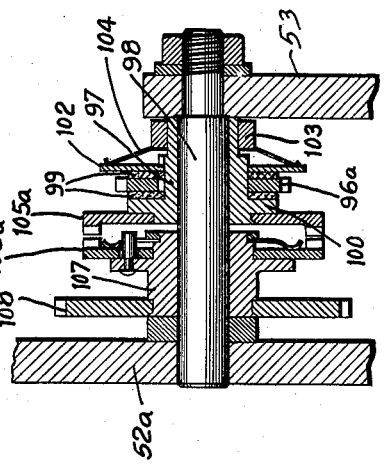

Fig. 12 is a section on lines 12—12 of Fig. 3.

Figure 13:
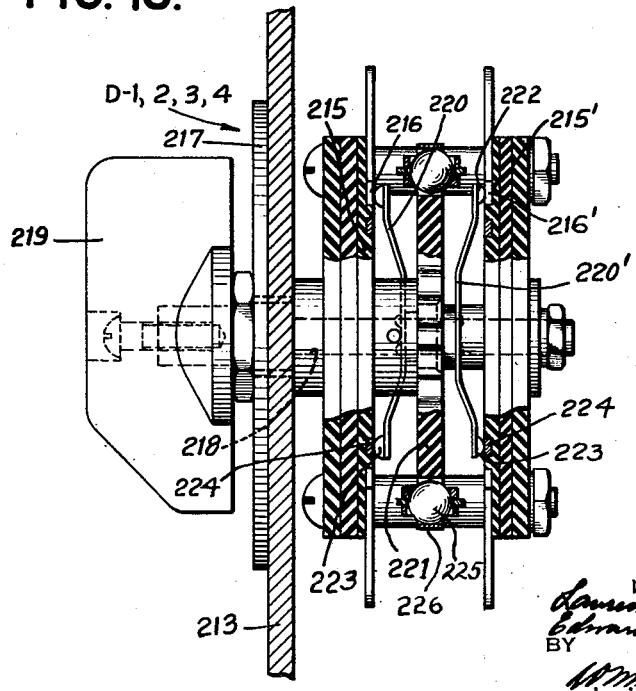

Fig. 13 is an end, sectional, view of a paragraph selecting dial.

Figure 14:
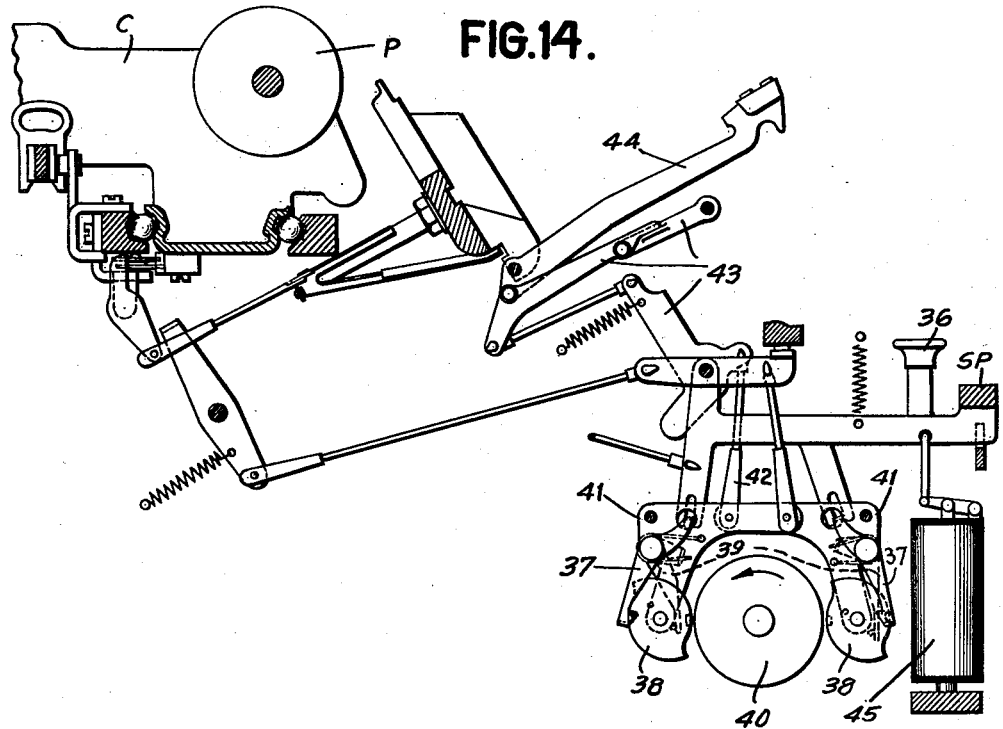

Fig. 14 is a sectional side view of the typewriter unit of the machine.

Figure 15:
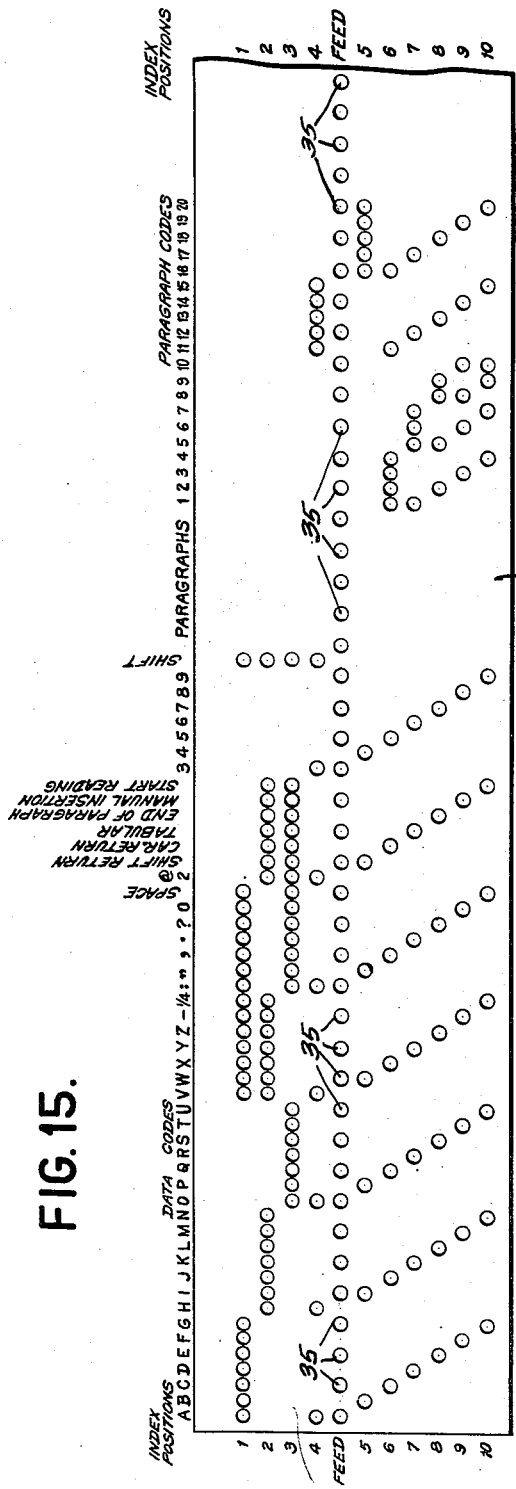

Fig. 15 shows a data tape and the code designations punched in the tape.

Fig. 16a is a part of the circuit diagram.

Figure 16B:
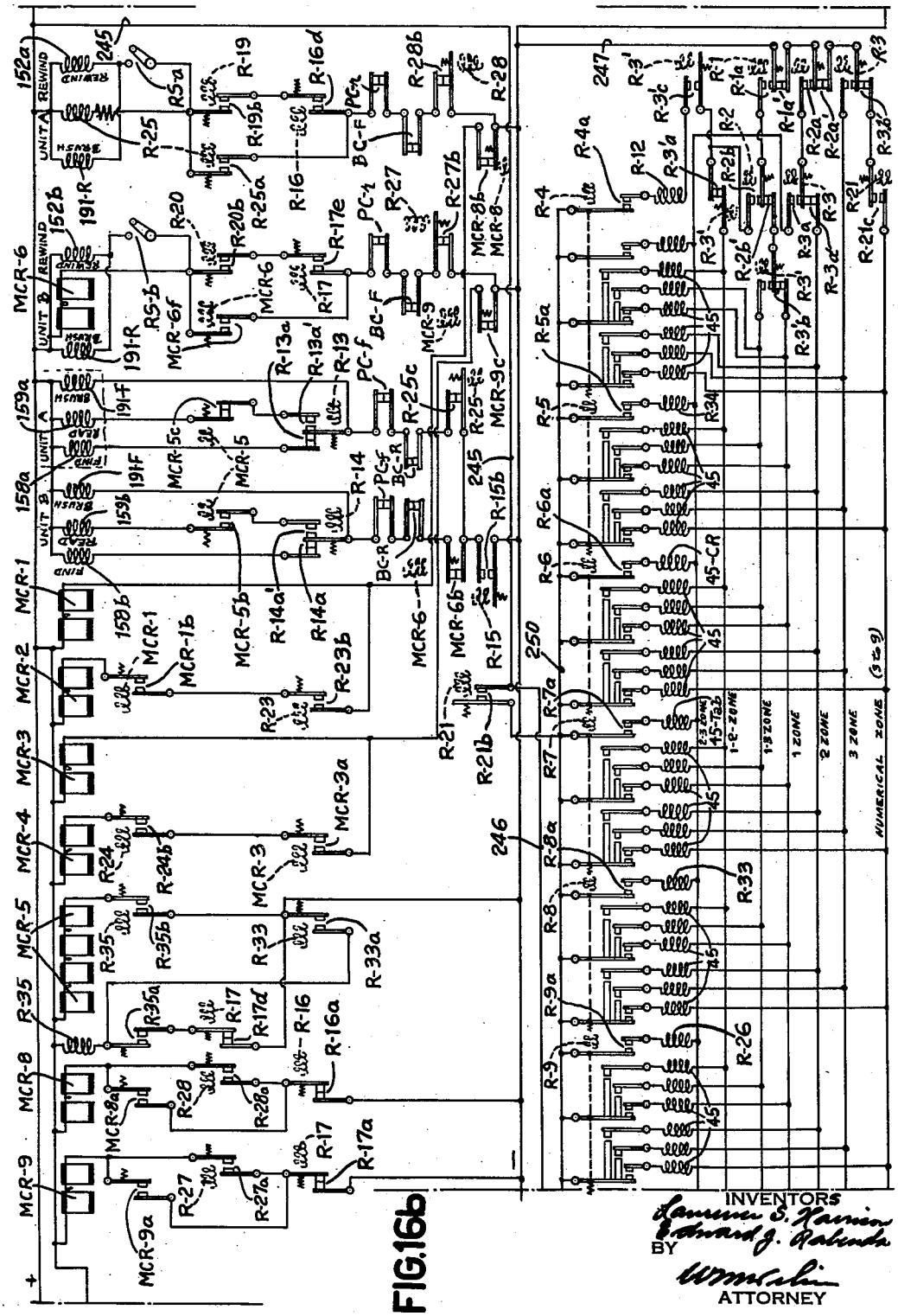

Fig. 16b is a continuation of Fig. 16a, and

Fig. 16c shows the remainder of the circuit diagram.

Plan of operation

The machine comprises a typewriter and a robot for controlling operation of the typewriter. The robot has means for reading or sensing coded designations punched into a pair of parallel tapes to control operation of the typewriter in accordance with these designations. Only one of the tapes at a time is operative to control the typewriter. Each tape has punched therein the data for a plurality of paragraphs. The robot includes four paragraph selecting dials, which are set in accordance with the paragraphs to be typed by the typewriter. Under control of the dials, paragraphs are selected alternately from the two data tapes and alternately read out to cause the typewriter to type the paragraphs. While one paragraph on a tape is being read out into the typewriter, the next paragraph on the other tape is being brought to control position. A maximum of four paragraphs, two from each tape, may thus be selected for each letter to be typed.

The data tapes

Fig. 15 shows a section of a data tape and the code used to designate and control different functions of the typewriter and robot. The tape is of dielectric material such as paper. Each coded designation occupies one column extending across the width of the tape. Each designation in a column represents a single letter, mark, or function. The minimum distance between successive data designations is the distance between successive columns. The tape feeds lengthwise and the distance between successive code designations and the rate of the feed of the tape determine the amount of time provided for the function designated by the perforations in a column to be performed. Certain functions of the typewriter, such as the carriage return, case shift, tabular spacings, and the like, take longer times than the ordinary type bar operation. Accordingly, between the code designation of functions such as carriage return, tabular space, and so on, and the next designation punching, a greater blank distance is provided on the tape than the minimum distance between successive columns. This provides a longer time for the typewriter to perform the function designated by the first code designation before the next designation reaches controlling position. Similarly, to give the robot also a longer time to perform certain functions, a sufficiently larger blank tape portion is provided between the controlling designation and the next designation. Further, certain designations as the paragraph codes may be punched across more than one column and may occupy the width of two or more columns, correspondingly giving a longer time for the paragraph code designation to control certain operations.

The minimum distance between successive designations is the distance between successive tape columns. Any other and larger distance between successive designations is an exact multiple of the minimum distance in order that the timing of certain read-out circuits may be correctly synchronized with the arrival of the designations at the reading or controlling position.

Each tape column has ten possible perforation-receiving or index positions which may be referred to as the 1 to 10 positions for receiving perforations 1 to 10. Between positions 4 and 5, the tape is provided along its length with spaced feed holes 35.

Perforation positions 1, 2, and 3 may be referred to as zone positions while perforation positions 4 to 10 may be referred to as interzone perforations. The coded designations may be considered as divided into eight zones, as follows: The 1 zone in which a perforation in the one position is accompanied by a perforation in an interzone position; the 2 zone having a common 2 position perforation plus an interzone perforation; the 3 zone having a common 3 perforation plus an interzone perforation; the 1—2 zone in which the 1 and 2 positions and one of the interzone perforations are punched; the 1—3 zone characterized by 1 and 3 and interzone punchings; the 2—3 zone in which the 2 and 3 positions and an interzone position are perforated; the blank zone having no zone perforations and characterized by a single perforation in one of the interzone positions, designations 3 to 9 being in this zone; and the paragraph zone characterized by two hole combinations of the 4 to 10 positions.

Two tapes, such as shown in Fig. 15 are provided. One tape will be referred to as tape T—*a* and the other as tape T—*b*.

A typical tape paragraph code punching is as follows:

The first designation of a paragraph is a paragraph code designation. Following at a multiple column distance from the paragraph code designation is a start read designation. After this, the tape is punched with a carriage return code, followed after a multi-column gap by a tabular code. The typewriter carriage is then in position for the beginning of the body of the paragraph. The tape is then punched with the code designations for causing the typing of the paragraph of data. At the end of the last item or punctuation mark designation in the paragraph, the tape is punched with a carriage return designation, thereby causing the typewriter carriage to return to the beginning of the line. After the carriage return code, the last designation code of the paragraph is an "end of paragraph" code which initiates the reading of the next selected paragraph punched in the other tape, in a manner which will be explained later.

In the present instance, each tape has twenty paragraphs 1 to 20 designated by their corresponding paragraph code designations. These paragraphs are disposed in succession in the order of the paragraph numbers, that is paragraph 1 is followed by paragraph 2, followed by paragraph 3 and so on. Obviously, the paragraphs may be varied in length in accordance with the amount of data and the number of lines of designations representing the data of the different paragraphs, and each paragraph of a tape may be referred to as a record form.

The typewriter

The typewriter is preferably of the power type, the principles of which are disclosed in Patents 1,777,055 and 1,873,512. Briefly, referring to Fig. 14, depression of a character key 36 releases a latch 37 from a cam 38 permitting a spring-pressed lever 39 to move the cam against a continuously rotating motor-driven shaft 40. The cam is rotated by frictional contact with the shaft in a direction to cause the rocking of the cam carrier 41 to depress a link 42. Depression of link 42 rocks a linkage 43 to propel the type bar 44 towards the platen P, causing the type on the type bar to print on the sheet positioned on the platen P.

The space bar SP operates through similar cam means and the power shaft 40 to cause operation of the carriage escapement to effect letter spacing of carriage C.

The carriage return key CR (Fig. 1) operates carriage return means such as disclosed in Patent No. 1,955,614.

The tabular mechanism operated by a tab key TAB (Fig. 1) is of the type disclosed in Patent No. 1,935,436.

As is well-known, the ordinary hold-down shift key SH (Fig. 1) is depressed to cause a capital case shift of the type and must continue to be held down to maintain the type in capital case position.

For each of the character keys 36, the space bar SP, the carriage return key CR, the TAB key, the shift key SH, and for any other typewriter key to be operated automatically, as well as manually, a solenoid 45, such as shown in Fig. 14 connected to the space bar SP, is provided. Solenoid 45 when energized depresses its associated key or bar to effect the same operation as when the key is manually depressed.

For convenience, the solenoids 45 may be distinguished from each other by appending the character corresponding to the element operated thereby to the common reference character 45. Thus, the solenoid for operating the "n" key 36 may be referred to as 45—*n*, the solenoid for operating the carriage return key may be referred to as 45—CR, and so on.

Solenoids 45 are selectively energized under control of the data punchings or designations of tapes T—*a* and T—*b*, in a manner which will be explained hereinafter.

Robot

The robot comprises the means for reading out the designations punched in the tapes into equivalent functions of the typewriter. As particularly indicated in Figs. 1, 3, and 8, the robot has two parallel tape sections or units A and B separated by a central drive section. The tape units A and B respectively contain the tapes T—a and T—b and the means for analyzing the tapes, while the central section contains means for driving the parts of the tape units for feeding the tapes. The main parts of tape units A and B may be distinguished by appending letters a and b to the reference characters of these parts.

Base 50 of the robot carries parallel standards 51a, 52a, 53, 54, 55b, and 56b. The central standards 53 and 54 are bridged near their ends by cross pieces or blocks 57 and 58 (see Figs. 3, 7, and 8) having bearings for journaling a main shaft 60. At one end, shaft 60 carries a pulley 61 connected by a belt 62 to a pulley 63 on a shaft 64 driven by a motor M rigidly hung from the base. During operation of motor M, shaft 60 will be continuously rotated.

Main shaft 60 carries at the rear end a spiral gear 65 meshed with a spiral gear 66 on a shaft 67 journaled in bearings carried by central standards 53 and 54. At the front end, shaft 60 carries a spiral gear 68 meshed with a spiral gear 69 on a shaft 70 parallel to shaft 67 and also journaled in bearings carried by the central standards. About midway between spiral gears 65 and 68, shaft 60 carries a worm 71 meshed with a worm wheel 72 on a shaft 73 also journaled in bearings carried by the central standards and parallel to shafts 67 and 70. Spiral gear pairs 65, 66 and 68, 69 have the same gear ratio but their teeth run in opposite directions so that shafts 67 and 70 are rotated at the same speed but in opposite directions by rotation of the main shaft 60 in one direction. Worm 71 coacts with worm wheel 72 to drive shaft 73 at about one-eighth the speed of shafts 67 and 70 and in the same direction as shaft 70, or in a direction opposite to that of shaft 67.

Rear shaft 67 operates, through selective clutch connections, to drive the tapes T—a and T—b towards the rear of the robot (as viewed in Fig. 3) during the finding of a selected paragraph code, and may be referred to as the find shaft. Front shaft 70 operates, through selective clutch connections, to rewind the tapes, causing movement of the tapes towards the front of the robot (as viewed in Fig. 3) and may be referred to as the rewind shaft. Intermediate shaft 73, through clutch and gear connections, feeds the tapes towards the rear, in the same direction as when fed by the finder shaft, but at a much slower rate, during the reading out of data into equivalent typewriter functions, and may be referred to as the read shaft.

At opposite ends of each of shafts 67, 70, and 73 are fixed similar ratchet-toothed driving clutch disks. A detailed description of one such driving clutch disk on the read shaft 73 will suffice to explain all these disks. Referring to Fig. 11, shaft 73 at opposite ends rigidly carries the hubs 75 of spur gears 76a and 76b. Rigidly fixed to gears 76a and 76b are driving clutch disks 77a and 77b. Clutch disks 77a and 77b are rigid with hub collars 78 in the interior of which are set ball bearings for journaling the reduced ends of shafts 79a and 79b which rigidly carry, through insulation, contact rolls 80a and 80b.

Similarly, find shaft 67, at opposite ends, rigidly carries the hubs of driving clutch disks 82a and 82b (Fig. 3), the hub collars of which journal the reduced ends of rear spool-drive shafts 83a and 83b, and rewind shaft 70 directly carries driving clutch disks 84a and 84b (see Figs. 3, 6, 8, and 10) the hub collars of which journal front spool-drive shafts 85a and 85b.

Each of contact roll-carrying shafts 79a, 79b, and spool-drive shafts 83a, 83b, 85a, and 85b rigidly carries a ratchet-toothed driven clutch disk for cooperating with the driving clutch disk the hub collar of which journals an end of the shaft. The driven clutch disks are of similar construction and a detail description of the one, 86a, on shaft 79a will suffice for all. Referring to Fig. 11, shaft 79a, at the end adjacent reader shaft 73, rigidly carries a flanged collar 87, the flange 88 of which is provided with pins 89 freely passing through holes in the base of driven clutch disk 86a. The driven clutch disk freely surrounds the neck of collar 87 at the right side (Fig. 11) of the collar flange 88 and may move axially along the neck, guided by pins 89, which also prevent the driven clutch disk from rotating relative to its carrying shaft. Between a retainer ring 90 fixed to the end of the collar 87 and the clutch disk is disposed a spring washer 93 for urging the driven clutch disk 86a away from the companion driving clutch disk 77a.

In a similar manner, shaft 79b carries driven clutch disk 86b facing driving disk 77b on read shaft 73; rear spool-drive shafts 83a and 83b, respectively, carry driven clutch disks 94a and 94b (Fig. 3) facing driving disks 82a and 82b on finder shaft 67, and front spool-drive shafts 85a and 85b carry driven clutch disks 95a and 95b (Figs. 3, 8, and 10) facing driving clutch disks 84a and 84b on rewind shaft 70.

Read shaft 73, as described above, acts through clutch connections to rotate shafts 79a and 79b of contact rolls 80a and 80b during the data reading operation. In addition to operating shafts 79a and 79b, the read shaft also acts through a friction or slip clutch and through a releasable toothed-clutch to rotate the rear spool-drive shafts 83a and 83b. The latter, it will be recalled, may also be driven, through clutch connections 82a—94a and 82b—94b, from find shaft 67. During the data reading operation, the clutch connections between the finder shaft and the rear spool-drive shafts are out of action, and the latter spool-drive shafts are driven by the read shaft 73. The driving connections between the read shaft and the rear spool-drive shafts 83a and 83b include gears 76a and 76b. Gears 76a and 76b respectively mesh with gears 96a and 96b (see Figs. 3, 7, 11, and 12).

Referring principally to Fig. 12, gear 96a is rotatably carried by a sleeve 97 freely surrounding a rod 98 mounted on and bridging standards 52a and 53. Gear 96a is engaged at opposite sides with friction rings 99 keyed to sleeve 97. One of the friction rings abuts a flange 100 of sleeve 97. The other friction ring abuts a disk 102 keyed to the sleeve. Fixed to the sleeve is a spacer 103 between which and the disk 102 is a spring washer 104. The tendency of the spring washer is to force disk 102 toward the abutting friction ring 99 which in turn presses against the adjacent side of gear 96a, the opposite side of which presses against the other friction ring 99, which presses against the flange 100 integral with sleeve 97. Thus, elements 99, 100, 102, 103, and 104 constitute friction or slip clutch connections between gear 96a and sleeve 97, permitting the gear to be positively driven by gear 76a while allowing the sleeve to slip and remain stationary.

To the end of the sleeve adjacent flange 100 is secured a ratchet-toothed driving clutch disk 105a.

Facing disk 105a is a companion driven clutch disk 106a mounted for rotation with a sleeve 107 freely surrounding rod 98. Fixed to sleeve 107 is a gear 108 which through an idler gear 109 (see Fig. 7) drives a gear 110 on spool-drive shaft 83a (also see Fig. 3). The gear transmission between shaft 83a and read shaft 73 is such as to cause shaft 83a to be driven by the read shaft in a direction opposite to the read shaft and at more than twice the speed of the latter. Thus, spool-drive shaft 83a is driven by read shaft 73 in the same direction as the spool drive shaft is driven, through clutch connections, by finder shaft 67. The latter, as previously explained rotates about eight times as fast as the read shaft. Spool drive-shaft 83a is rotated by the read shaft at more than twice the speed of the latter. Thus, when the spool-drive shaft 83a is driven by finder shaft 67, it rotates about four times as fast as when driven by the read shaft 73.

Similarly, read shaft 73, through gear 76b, rotates gear 96b, which frictionally rotates the drive clutch disk 105b for cooperating with driven clutch disk 106b (Fig. 3) which through gearing 108, 109, 110 rotates spool-drive shaft 83b.

Rear spool-drive shafts 83a and 83b and front spool-drive shafts 85a and 85b have similar yieldable drive connections to the spools which carry the tapes A and B. Referring principally to Figs. 3, 6, and 10, the yieldable drive connection comprises a collar 112 fixed to the spool-drive shaft and an end retainer flange 113 past which the reduced end of the spool drive shaft extends. Embracing collar 112 and fixed thereto and to the spool-drive shaft is the hub 114 of a double-arm drive member 115. Between flange 113 and the side of hub 114 and rotatably carried by a portion of collar 112 is a driven member 116. The latter is provided with a pair of diametrically opposite pins 117 and 118 extending transversely past the plane of drive member 115. The drive member has a pair of shorter pins 119 extending towards the driven member 116. Between one of the pins 119 and pin 117 is connected a coil spring 120 and a similar spring connects the other pin 119 to the pin 118. These springs yieldably urge the driven member 116 to follow the drive member 115 when the latter is rotated counterclockwise (Fig. 6) by front spool drive shaft 85a, and to hold pin 117 against a shoulder 121 of the drive plate. Should the driven plate 116 be restrained from freely and immediately following the drive plate 115, springs 120 will yield permitting the drive plate to move ahead until a shoulder 122 thereon, diametrically opposite shoulder 121, abuts the pin 118 of the driven plate. Thus, when the spool-drive shaft is set in motion, springs 120 yield to prevent abrupt pick-up of the driven plate 116. The driven plate is directly connected to the tape spool, as will be shortly explained, and the main purpose of preventing sudden, unyielding movement of the driven plate is to prevent a sudden jerk on the tape when the spool starts its movement.

There are four spools 125 of duplicate construction, two for each of tapes T—a and T—b. For convenience, the rear spools (as viewed in Fig. 3) may be referred to as spools 125—r and the front spools as 125—f. Each spool comprises a cylinder 126 (see Fig. 6) having suitable provisions for detachably securing one end of a tape.

Secured to the cylinder ends are side flanges 127 having center openings, one to freely receive the end of the spool-drive shaft projecting past the retainer flange 113 (see Figs. 6 and 10), and the other to receive the reduced, round, portion 128 of the cage 129 mounted through ball bearings on the inner end of a rod 130 (see Figs. 3, 4, 5, and 8).

There is one rod 130 alined with each spool-drive shaft and combining with the latter to journal one spool 125. Each rod 130 is slidably and rotatably carried by one of the end standards 51a and 56b. Externally of the end standard, rod 130 carries a knurled knob 131 for manipulating the rod. The rod is recessed adjacent the ball-bearing end to accommodate the forked upper end of a plate spring 132 secured at the lower end to the end standard. Spring 132 urges the rod 130 towards the alined spool-drive shaft. The driven plate member 116 on the spool-drive shaft has an off-center drive stud 133 (see Figs. 3, 6, 8, and 10) adapted to fit into any of the holes 134 formed in a circular row about the center of either spool flange 127.

To insert a spool 125 in place, rod 130 is retracted against resistance of spring 132, permitting the spool to be moved freely into the space between the spool-centering end of the spool-drive shaft and the reduced end 128 of ball-bearing cage 129 mounted on rod 130. The center hole of the spool flange 127 adjacent the spool-drive shaft is then slipped onto the reduced end of the latter shaft and at the same time, one of the off-center holes 134 of the flange is slipped onto the off-center drive stud 133 of the driven plate 116. Rod 130 is then released to permit the spring 132 to move the reduced end 128 of the ball-bearing cage 129 into the center hole of the adjacent flange 127 of the spool. The pressure of spring 132 forces the shoulder 135 (Figs. 3 and 5) of the ball cage 129 against the side of the spool flange centered on the reduced end of the cage. This pressure is also transmitted to the opposite spool flange to press the latter against the side of end flange 113 of the collar 112 on the spool-drive shaft, and at the same time to maintain the spool flange in cooperation with the centering end of the latter shaft and with the drive stud 133 of the driven plate 116. Due to the frictional engagement between the shoulder 135 of ball cage 129 and the side of the spool flange, the ball cage rotates with the spool, thus providing an anti-friction bearing for the outer end of the spool. The other, inner end of the spool rotates with the driven plate 116.

In above manner, each of the four spools 125 is mounted for rotation with the driven plate 116 of one of the four spool-drive shaft assemblies.

Each spool, when in place, is constantly engaged by a friction brake to prevent unrestrained rotation of the spool when the tape is being unwound therefrom. Each friction brake comprises a friction block 136 (Figs. 3, 6, and 8) engaged with one of the spool flanges 127. The friction block is fastened to the end of an arm 137 rotatably carried by a shaft 138 and urged transversely towards the spool by a spring 139 surrounding the rod. A spring 140 secured to arm 137 and the frame urges the brake block upwardly to maintain constant engagement with a spool flange 127 when the latter is in position in the machine. When a spool is being inserted in place, the brake block is manually depressed. Failure to do so causes the side of the spool flange to engage the side of the brake block and moves the latter sidewise against resistance of spring 139, the yielding of the spring preventing injury to the spool flange or its brake.

The tape extends from one spool over a guide plate 141 (Figs. 4 and 6) the upper, tape-engaging, face of which extends substantially tangential to the periphery of the contact roll 80, then over the surface of the contact roll, then over another guide plate 141, and to the other spool. The guide plates 141 are secured to standards 51a and 52a and are beveled along their opposite parallel edges to eliminate angular corners from the path of the tape.

During the reading of data from a tape to control functions of the typewriter, the tape moves from front spool 125—f to rear spool 125—r, being unwound from the front spool and wound onto the rear spool. The direction of movement of the tape during data reading may be referred to as the reading direction. The means for feeding the tape during this reading operation is operated by read shaft 73. As already described, the read shaft is connected through the pairs of clutch elements 86 and 77 to the shafts 79 of the contact rolls 80. Each contact roll has, intermediate its ends, a circular row of radially projecting feed pins 142 (Figs. 4, 6, and 11) which are adapted to enter feed holes 35 of the data tape to positively feed the tape during rotation of the contact roll by the read shaft.

When the shaft of contact roll 80a or b is clutched to read shaft 73, the latter rotates the contact roll counterclockwise (as viewed in Figs. 4 and 6), causing feed pins 142 by coaction with tape holes 35 to feed the tape in the reading direction, to the left. As the tape moves to the left, it unwinds from its front spool 125—f, rotating the latter against the frictional restraint of the brake element 136 engaged with a spool flange 127. Due to the resistance of the spool to free rotation, the tape between the contact roll and the spool tends to move ahead of the spool and to thereby remain taut. At the same time as the tape is unwinding from the front spool, it must be wound on the rear spool 125—r. Accordingly, during the feeding of the tape by the contact roll pins 142, the rear spool must be rotated clockwise (Figs. 4 and 6). This is done through the previously explained clutch and slip transmission between the rear spool drive shaft 83a or b and the read shaft 73. The transmission, for instance, between read shaft 73 and the spool-drive shaft 83a of the rear spool of the unit A section comprises gear 76a on the read shaft, gear 96a meshed therewith, friction or slip clutch elements 99, 100, 102, 103, and 104 between gear 96a and sleeve 97 (see Fig. 12), the driving clutch disk 105a rigid with the sleeve hub, the driven clutch disk 106a, gear 108 rotatable with the driven disk, idler gear 109, and gear 110 (Fig. 7) on spool drive shaft 83a.

As previously explained, the spool-drive shaft 83a is driven, by the above transmission, at more than twice the speed of read shaft 73. The diameter of the cylinder 126 of a spool 125 is substantially the same as the diameter of a contact roll 80. Thus, with the rear spool being driven at more than twice the speed of the contact roll, the rate of feed of the tape by pins 142 of the contact roll is less than the minimum rate at which the rear spool tends to wind up the tape. As a result, the tape portion extending between the contact roll and the rear spool is constantly maintained taut during the feed of the tape during data-reading operation. When the tape is sufficiently taut, it restrains rotation of the rear spool, this being permitted by the friction or slip drive connections in the transmission between read shaft 73 and the rear spool. Thus, the rear spool is permitted to wind up the tape during the reading operation at a rate governed only by the rotation of the contact roll and in such a way that the tape portion passing over the contact roll is maintained constantly taut.

During the paragraph find operation, when a selected paragraph on the tape is being sought, the find shaft 67 is clutched to the rear spool-drive shaft and positively rotates the rear spool in the same direction as when impositively driven by read shaft 73. At this time, the contact roll is declutched from read shaft 73 and the front spool-drive shaft is declutched from rewind shaft 70. With the rear spool drive shaft clutched to the find shaft 67, the rear spool will be positively rotated clockwise (Figs. 4 and 6) at four times the speed at which it is driven from the read shaft 73. As the rear spool rotates clockwise, it winds up the tape, feeding it to the left (Figs. 4 and 6) or in the reading direction. As the contact roll is free to rotate, the tape, while being wound on the rear spool, rotates the contact roll by coaction of tape holes 35 with pins 142 of the contact roll. Also, the tape unwinds from the front spool, just as during the reading operation.

During the reading operation, the rate of feed of the tape is governed by rotation of the contact roll by read shaft 73, while during the finding operation, the rate of feed of the tape is governed by rotation of the rear spool through driving connection to find shaft 67. As previously explained, rotation of the read shaft is at about one-eighth the speed of rotation of the finder shaft. Thus, the tape is moved at least eight times as fast during the finding operation as during the data reading operation. Further, as the size of the tape roll on the rear spool increases, the speed at which the tape is wound thereon during operation of the find shaft increases.

When the front spool drive shafts 75a and b are clutched to rewind shaft 70, then the contact rolls are not clutched to read shaft 73, and the rear spool drive shafts 83a and b are not driven by either the read shaft or the find shaft. Thus, during the rewind operation, only the front spools 125—f are positively driven. The driving of the front spools is in a counterclockwise direction (Figs. 4 and 6), causing movement of the tape to the right or in a rewind or reverse direction. During movement of the tape to the right, tape holes 35 coact with contact roll pins 142 to rotate the contact roll clockwise, and at the same time the tape unwinds from the rear spool, rotating the latter counterclockwise, against restraint of the friction block 136 engaged with a spool flange 127. The rate of feed of the tape during rewind operation is dependent upon the speed at which the front spool 125—f is being driven by the rewind shaft 70 and also on the diameter of the tape roll wound on the front spool. Since the speed of the rewind shaft is about eight times that of the read shaft, the tape is fed a minimum of eight times as fast during rewind operation as during data reading operation, or at substantially the same rate as during finding operation.

Underlying each spool is a bail rod 143 (see Figs. 3, 6, and 8) rotatably carrying rubber rollers 144. The bail rod is carried by arms 145 fast to shaft 138. On this shaft is also fast a bell crank 146, of which the lower, vertical arm is connected to a coil spring 147 and of which the horizontal arm rigidly carries an insulating plate 148 overlying the end of a lower spring contact blade 149 provided with one of the contact points PC the companion point of which is on a spring blade 151 (also see Figs. 4 and 9). The spring 147 tends to rock shaft 138 in a direction to move the insulating plate 148 down against the end of spring blade 149, to thereby open contacts PC. This action is normally prevented by engagement of the tape roll on a spool with the rubber rollers 144 engaged therewith. The engagement of the tape roll with rollers 144 keeps the bail rod 143 in a lowered position, maintaining the insulating piece 148 free of contact blade 149. When the diameter of the roll of tape on a spool falls below a prescribed minimum, shaft 138 is permitted to rock under the influence of spring 147 in a direction to cause opening of contacts PC associated with the spool. The minimum tape roll diameter is normally reached when the data or designation-punched portion of the tape has been unwound from the roll. Each pair of contacts PC may be referred to as a paper roll switch and distinguished in accordance with the spool under which its control bail lies. Thus, the paper switch for sensing depletion of the designation portion of the tape roll on the front spool 125—f of unit A may be characterized in the circuit diagram as PC—f (Unit A), one controlled by the roll on rear spool 125—f may be distinguished as PC—r (Unit A); and similarly for unit B.

To clutch the shafts 67, 70, and 73 to the shafts driven thereby, the driven clutch disks are moved towards the companion driving clutch disks under control of solenoids. The clutch coupling means for each shaft will now be described.

The driven clutch disk 95a of front spool-drive shaft 85a is moved into engagement with driving clutch disk 84a of rewind shaft 70 under control of a solenoid 152a (Figs. 3 and 6). Energization of solenoid 152a attracts its plunger 153 which acts through a link 154, to rock a bell crank 155 clockwise (Fig. 6) against resistance of a restoring spring 156. The free end of the bell crank rotatably carries a disk 157 having a beveled edge underlying the rounded, rear, peripheral edge of the driven clutch disk 95a (also see Fig. 8). When energization of solenoid 152a causes rocking of bell crank 155, disk 157 rises and its beveled edge cams against the rear, peripheral edge of the driven clutch disk 95a to force the latter towards and into mesh with the driving clutch disk 84a on the rewind shaft 70. As long as solenoid 152a is energized, the driven clutch disk will remain engaged with the driving clutch disk, thereby coupling the front spool-drive shaft 85a to the rewind shaft for rotation by the latter.

Similarly, driven clutch disk 95b is engaged with driving clutch disk 84b on the rewind shaft by operation of a disk 107 upon energization of a solenoid 152b (Figs. 3, 7, and 8).

Through similar means, solenoids 158a and 158b (Figs. 6, 7, and 11) when energized respectively mesh driven clutch disks 94a and 94b with driving clutch disks 82a and 82b on find shaft 67, to couple near spool drive shafts 83a and b to the finder shaft.

A single solenoid 159a (Figs. 3, 6, 7, and 11) is provided to control operation of both driven clutch disks 86a and 106a. Another such solenoid 159b operates clutch disks 86b and 106b. Energization of solenoid 159b, for instance, attracts its plunger 160 connected through a link 161 to a bell crank 162 to rock the bell crank and depress the beveled disk 163 (Fig. 7) carried by the latter towards the driven clutch disk 106b (Fig. 3), causing the latter to mesh with driving clutch disk 105b which is in the slip clutch transmission between the read shaft 73 and the rear spool shaft 83b. Link 161 is also connected through a second link 164 with a second bell crank 165 (also see Fig. 11), the beveled disk 166 of which coacts with driven clutch disk 86b. Thus, when solenoid 159b is energized, its plunger is attracted against resistance of a restoring spring 167 to simultaneously depress beveled disks 163 and 166 to respectively mesh the driven clutch disk 106b with driving clutch disk 105b and the driven clutch disk 86b with the driving clutch disk 77b on the read shaft 73.

Similarly, energization of solenoid 159a causes clutch disks 106a and 86a to mesh respectively with driving clutch disks 105a and 77a.

It is apparent, then, that upon energization of a solenoid 159, the read shaft 73 is coupled, through a clutch 77—86, to a shaft 79 to rotate the contact roll 80 fixed thereto, while at the same time, the clutch 105—106 in the slip drive transmission from the read shaft to the rear spool-drive shaft 83 is rendered effective.

Two parallel rows of brushes F and R are provided for each of units A and B to sense the perforations of the data tapes T—a and T—b (see Figs. 3, 4, 6, 8, and 11). Each row of brushes extends across the width of the contact roller and across the width of the tape passing over the contact roller. One brush of each row is located along the line of travel of one index or perforation receiving position of the tape. There are ten such index positions 1 to 10 (Fig. 15), and, correspondingly, there are ten brushes in each row adapted to sense the ten index positions 1 to 10. For convenience, these ten brushes of a row may be distinguished by appending the numbers of the index positions sensed by them to the common reference character, as indicated in Fig. 11; for instance, brush R—6 (Fig. 11) senses the index points 6 of the tape. An additional brush in each row is provided for sensing the bare surface of the contact roller to act as a common return brush. The latter brush may be distinguished by appending the letter c to the general reference character.

Referring to Fig. 6, brushes F are inclined in the reading direction of travel of the tape, from right to left. When placed in engagement with the tape during movement of the latter in the reading direction, the brushes will flex to the movement of the tape and sense the perforations thereof without obstructing the travel of the tape or being injured by the tape. Brushes F, then, are the brushes for sensing the tape during its movement in a reading direction. Brushes R are inclined oppositely to brushes F to sense the tape during its travel from left to right or in the rewind direction. Brushes R, then, are the brushes for sensing the tape while being rewound.

Each row of brushes is secured to a block 170 of insulating material. The rear ends of each pair of corresponding, alined, brushes F and R are in constant wiping engagement with the sides of a conductive plate 171 rigidly set in the apex of an inverted V-molding 172 of dielectric material. These conductive plates 171 form bridging conductors for conductively connecting the brushes F and R which sense the same index positions of the tape and for conductively connecting the two common return brushes F—c and R—c.

Molding 172 is formed with parallel slots 173

(Figs. 3, 6, and 11) through which the brushes F and R extend towards the contact roller. The diverging arms of the V-molding are located at a slight distance above the contact roller and are substantially tangential to the roller. The lower ends of the arms of the molding overlap the upper ends of the guide bars 141, to act as upper holddown guides for the tape passing over the guide bars. The crotch of the molding is concentric with the periphery of the contact roller to act as an upper guide for the tape passing over the contact roller.

Molding 172 is fastened at opposite ends by screws 174 (Fig. 11) to the parallel sides of an open rectangular casting 175. Each casting is formed with bosses 176, adjacent the central, drive section of the robot, for receiving a hinge pin 177. The casting of unit A is thus hinged on a pin 177 carried by standard 52a (see Figs. 3 and 11) while the casting of unit B is similarly hinged to standard 55b (also see Fig. 7).

Each casting 175 may be swung back on its hinge from normal operating position above the contact roll of a unit to an out-of-the-way position above the central section of the robot, thereby fully exposing the contact roll and the tape. The normal operating positions of the castings 175 are indicated in full lines in Fig. 11, which also shows in dotted lines the alternate, idle, out-of-the-way position of the casting of unit A. When the casting and the brush assembly carried thereby are in idle position, the operator has full access to the contact roller and tape to permit the tape to be removed from or inserted on the contact roller.

As explained above, casting 175 is supported at the side adjacent the central section by the hinge pin 177. The opposite side of the casting, when in normal position, rests on top of the end standard 51a or 56b. To accurately locate the casting, and thereby the brush assembly, when the casting is in operative position, the outer end of the casting is provided with a locating pin 178 (Fig. 11) received in a hole 179 in the end standard.

For releasably retaining casting 175 in its normal, down, position, a plate 180 is secured to the top of the outer casting side for cooperating with a latch hook 181 pivoted to the outer face of the end standard (see Figs. 3, 4, 8, and 11). A spring 182 connected to the latch hook urges the latter into latching engagement with the plate 180.

As explained thus far, casting 175 rigidly and dependently carries the inverted V molding 172 and brushes F and R are fixed to blocks 170. Each of blocks 170 is fastened to a separate bail bar 185 (Figs. 3, 6, and 8). The two bail arms 186 (Figs. 4 and 8) at opposite ends of bar 185 and bent at right angles to the latter are engaged with pivot studs 187 carried by the sides of casting 175. The bar 185, the block 170, and the sensing brushes carried by the block are thus rockably mounted on the casting 175. One of the bail arms 186 of each bar 185 is formed with an upward extension 188 (Figs. 3, 4, 6, 7, and 8) bent to dispose its upper end contiguous to the side of a link 189 to one end of which it is pivotally connected. The other end of link 189 is connected to the plunger 190 of a solenoid 191. The upper end of extension 188 is connected to a spring 192 which acts to retract the plunger 190 and at the same time to rock the bail bar 185 in such a direction as to raise the block 170. The brushes carried by the block 170 are then in raised, inactive, or idle position, at a clear distance above the contact roller, and with their lower portions completely within the slots 173 of the molding 172. The back of extension 188 engages a stop screw 193 (Figs. 4 and 6) to limit the action of spring 192 and to determine the inactive position of the brushes. When a solenoid 191 is energized, it rocks the bail 185—186 in a direction to lower the brush block 170, moving the lower ends of the brushes towards the contact roller, and into engagement with the tape portion of the contact roller.

Each solenoid 191 controls a different set of brushes F and R. To further distinguish the solenoids, they may be characterized as 191—F and 191—R, respectively, controlling the forward brushes F and the rewind brushes R of a tape unit.

Carried by the side of molding 172 adjacent forward reading brushes F is a switch assembly comprising a pair of spring blades 194 and 195 (see Figs. 6 and 8) provided with coacting brush carrier-controlled contacts BC—F (also see Fig. 4). The upper blade 194 underlies the insulated tip of a screw 197 carried by a member 198 fastened to the back of the adjacent bail bar 185. Screw 197 will move with bail bar 185 which rigidly carries the block 170 supporting the set of brushes F. When the brushes F are in raised, inactive, position, bar 185 will be in lowered position and the insulated tip of screw 197 will engage upper blade 194 to force contacts BC—F to close. When the brushes are moved down to active position, bar 185 rises and screw 197 withdraws from blade 194 which springs away from blade 195, permitting contacts BC—F to open.

Similarly, a pair of contacts BC—R at the rewind brush side of the brush assembly are opened when the brushes R are down in active position and closed when the brushes are in inactive, raised, position.

The shaft 79a of contact roller 80 rigidly carries, adjacent standard 52a, a circuit breaker cam ring 200a (Figs. 3, 6, and 11) of dielectric material formed around its periphery with depressions 201 spaced apart at distances corresponding to that between adjacent designation-bearing columns of a data tape. Engaging the circuit breaker ring 200a is a roller 202 (see also Fig. 6a) carried by the lower end of a lever 203, the upper end of which carries a circuit breaker contact point CB—a for cooperating with a stationary companion contact point CB—a. A spring strip 205 is fastened at one end to the robot frame and curled around the pivot of lever 203 to be fastened at the opposite end to the lower arm of the lever. The tendency of spring 205 is to rock lever 203 clockwise to maintain follower roller 202 engaged with the periphery of circuit breaker ring 200a.

When the follower roller 202 is in a depression 201 of the circuit breaker cam 200a, then lever 203 is at its clockwise limit, and contacts CB—a are closed. When a high portion of the breaker cam 200a, separating adjacent depressions 201, engages roller 202, the lever 203 is rocked counterclockwise, opening contacts CB—a.

Circuit breaker cam 200a rotates with contact roller 80a and successive depressions 201 of the cam are engaged with the roller 202 during the passage of successive columns of the data tape past a row of active brushes. The depressions 201 and the intermediate high points or peaks are so arranged relative to feed pins 142 of the contact roller, which determine the positions of the tape, as to cause contacts CB—a to make just after a perforation of a tape column reaches an active sensing brush and to break just before the perforation leaves the brushes. Thus, contacts CB—a take the spark off the sensing brushes upon making and breaking of the sensing circuit.

Similarly for the tape unit B, a circuit breaker cam 200b is provided (Fig. 11) for operating a lever 203 to control the make and break circuit breaker contacts CB—b (Fig. 3), which time the sensing circuits made by the brushes of unit B when they engage the contact roller 80b through perforations in tape T—b.

A cover 210 (Figs. 1, 4, and 6) is removably secured to casting 175 to protect the brush assembly carried by the casting.

As indicated in Figs. 1 and 2, the robot is preferably carried by a drawer 212 of the desk on which the typewriter unit is placed. The front panel 213 of the drawer carries four paragraph selecting dials, characterized as D—1, 2, 3, and 4. Dial D—1 selects the first paragraph of the letter from tape T—a, dial D—2 selects the second paragraph of the letter from tape T—b, dial D—3 selects the third paragraph of the letter from tape T—a, and dial D—4 selects the fourth paragraph of the letter from tape T—b.

The construction of a paragraph selecting dial is indicated in the sectional end view, Fig. 13, and will be further understood from the circuit diagram (Fig. 16c).

Each dial is provided with a front contact-carrying plate or panel 215 and a similar back panel 215', both of insulating material. Panels 215 and 215' respectively carry ten contact studs 216 and 216', the studs of one panel having the same positions as the studs of the other panel with respect to the dial center. The front of the dial is provided with an indicating plate 217 having numbers corresponding to the paragraphs which may be selected by the dial. As indicated in Fig. 16c, dial D—1 may select paragraphs 1 to 10 of tape T—a, dial D—2 may select paragraphs 1 to 10 of tape T—b, dial D—3 may select paragraphs 11 to 20 of tape T—a, and dial D—4 may select paragraphs 11 to 20 of tape T—b.

The shaft 218 of a selecting dial carries a combination knob handle and pointer 219 to turn the shaft for selecting a desired paragraph as indicated by the indicating plate 217. Fastened to shaft 218, centrally between the front and back panels 215 and 215' is a notched disk 221 of dielectric material which carries, at opposite faces, a front switch blade 220 of spring material and a similar back switch blade 220', each having at one end a nib 222. The nib 222 of the front blade 220 is adapted to engage contacts 216 of the front panel while the similar nib of the back blade 220' is adapted to engage back contacts 216'. Each switch blade, at the end opposite its nib 222, has a similar nib 223 for wiping a common contact ring 224 in every position of dial shaft 218. The switch blades 220 and 220', being carried and separated by insulating disk 221 are insulated from each other, so that, in effect, the front blade and contacts wiped thereby constitute a front multipoint switch of a dial electrically distinct from the back blade and contacts wiped thereby, which constitute a back switch of the dial. Being mechanically connected, the front and back switch blades of a dial are commonly adjusted by the turning of shaft 218, and in each position of adjustment of the shaft, both the front and back blades respectively engage corresponding front and back contact studs.

The blades of a dial are impositively retained in any paragraph selecting position by the coaction of ball latches 225 with the notches of the blade-carrying disk 221. The ball latches are urged towards the disk 221 by springs 226.

*Circuits and operation*

The operation of the machine will be made clear in the description of the circuits and with particular reference to the circuit diagrams, Figs. 16a, b, and c.

Assume, as an example, that a letter is to be typed with paragraphs 8 and 15 of tape T—a and 4 and 17 of tape T—b. The order in which the tape paragraphs will control operation of the typewriter and be transcribed by the latter is 8 (T—a), 4 (T—b), 15 (T—a), and 17 (T—b). The paragraph selecting dials are set as follows:

D—1 at 8
D—2 at 4
D—3 at 15
D—4 at 17.

After placing a letter sheet in the typewriter and typing in the date, inside address, and salutation, the operator closes main switch 230 (Fig. 16a) putting power on the + and — lines. Motor M of the robot is directly across the + and — lines and closing of the main switch immediately sets this motor running. Motor M now constantly rotates main shaft 60 of the robot (see Figs. 3, 7, 8 and 11). Motor T—M of the typewriter is in series with a toggle switch 231 of the typewriter unit (also see Fig. 1). When this toggle switch is closed by the operator, with switch 230 also closed, motor T—M is set running to continuously rotate power shaft 40 of the typewriter (see Fig. 14).

The closing of main switch 230 in addition to setting motor M running, and permitting motor T—M to be set in operation, also completes the following circuits (middle of Fig. 16b):

*Relay coils MCR—1.*—From the + line, through coils MCR—1, normally closed contacts MCR—8b, to the — line.

*Relay coils MCR—3.*—From the + line, through coils MCR—3, normally closed MCR—9c contacts, to the — line.

If the tape paragraph to be selected is initially past and to the right (Fig. 6) of the tape-sensing brushes F and R, then the tape should be fed in the reading direction, right to left, to bring the chosen paragraph to control position. If the chosen paragraph is in advance or to the left of the brushes, then the tape should be fed in the rewind direction, left to right, to bring the paragraph to control position. To take care of all conditions, the tape is first moved in a rewind direction by rewind shaft 70 (Figs. 3, 7, and 8) and the rewind brushes R set in active position. Then if the chosen paragraph is to the left of the brushes R, the paragraph code will be sensed by the rewind brushes R and the tape rewind interrupted. The tape will then be moved in a reading direction by the read shaft 73 to have the selected paragraph data sensed by the forward brushes F for controlling operation of the typewriter. If the chosen paragraph is initially to the right of the brushes R, then the rewind operation will proceed until the tape is fully rewound on its front spool 125—f (Fig. 6). The tape will then be fed in a reading direction by the finder shaft 87 (Figs. 3 and 7) and brushes F placed in active position to sense the chosen paragraph code, after which the read shaft 73 will continue forward feed of the tape at a slower rate and the selected paragraph data read out by brushes F to control the typewriter.

Rewinding

As indicated above, the first operation to be performed is the rewinding of tapes T—a and T—b. To initiate rewinding operations, the operator depresses rewind key RW (Fig. 2 and middle of Fig. 16a), establishing the following circuit:

*Relay coils R—30 and R—31.*—From the + line, through coils R—31 and R—30 in series, through rewind key contacts RW', to the — line.

Energization of coil R—30 closes contacts R—30a, to form the following stick circuit:

*Stick circuit: Coils R—30 and R—31.*—From the + line, through coils R—31 and R—30, contacts R—30a, normally closed MCR—6a contacts, to the — line.

Coil R—31, being energized, closes contacts R—31a and R—31b to form separate circuits through relays coils R—16 and R—17, as follows (middle of Fig. 16a):

*Coil R—16.*—From the + line, through coil R—16, contacts R—31a, to the — line.

*Coil R—17.*—From the + line, through coil R—17, contacts R—31b, to the — line.

Energization of coil R—16 closes contacts R—16c to form the following circuit through relay coil R—23 (left hand portion of Fig. 16a):

*Coil R—23.*—From the + line, through coil R—23, contacts R—16c, to the — line.

Energization of coil R—23 closes stick circuit contacts R—23a to form the following stick circuit:

*Stick circuit: Coil R—23.*—From the + line, through coil R—23, contacts R—23a, normally closed R—25d contacts, to the — line.

Energization of coil R—17 closes contacts R—17c to form the following circuit (left portion of Fig. 16a):

*Relay coil R—24.*—From the + line, through coil R—24, contacts R—17c, to the — line.

Coil R—24 closes contacts R—24a to form the following stick circuit:

*Stick circuit: R—24.*—From the + line, through coil R—24, contacts R—24a, and normally closed MCR—6c contacts, to the — line.

Energization of coil R—23 also closes contacts R—23b and with coils MCR—1 already energized and closing contacts MCR—1b, the following circuit is formed (middle of Fig. 16b):

*Relay coils MCR—2.*—From the + line, through coils MCR—2, contacts MCR—1b, contacts R—23b, normally closed MCR—8b contacts, to the — line.

Also, with coil R—24 energized to close contacts R—24b and with coils MCR—3 energized to close contacts MCR—3a, the following circuit is formed (left center of Fig. 16b):

*Relay coils MCR—4.*—From the + line, through coils MCR—4, contacts R—24b, contacts MCR—3a, normally closed MCR—9c contacts, to the — line.

Energization of a coil MCR—2 closes contacts MCR—2a to form the following circuit (middle of Fig. 16a):

*Relay coil R—19.*—From the + line, through coil R—19, contacts MCR—2a, normally closed MCR—8d contacts and R—25b contacts in parallel, and to the — line.

Energization of coil R—19 closes contacts R—19a to form the following stick circuit:

*Stick circuit: R—19.*—From the + line, through coil R—19, contacts R—19a, contacts MCR—8d and R—25b in parallel, to the — line.

Energization of coil R—19 also closes contacts R—19b and with contacts R—16d now closed due to energization of coil R—16, energization of unit A rewind control coil R—25 is effected by the following circuit (right side of Fig. 16b):

*Relay coil R—25.*—From the + line, through coil R—25, contacts R—19b, contacts R—16d, rear tape spool sensing contacts PC—r (unit A), forward brush holder contacts BC—F (unit A), normally closed R—28b contacts, to the — line.

Coil R—25 closes contacts R—25a to form stick circuit as follows:

*Stick circuit R—25.*—From the + line, through coil R—25, contacts R—25a, contacts PC—r (unit A), contacts BC—F (unit A), contacts R—28b, to the — line.

Energization of coils MCR—4 has also taken place, closing contacts MCR—4a to form the following circuit (left center of Fig. 16a):

*Relay coil R—20.*—From the + line, through coil R—20, contacts MCR—4a, contacts MCR—9d and MCR—6d in parallel, to the — line.

Energization of coil R—20 closes contacts R—20a to form the following stick circuit:

*Stick circuit: R—20.*—From the + line, through coil R—20, contacts R—20a, and contacts MCR—9 and MCR—6d in parallel, to the — line.

Energization of coil R—20 also closes contacts R—20b and with contacts R—17e closed as a result of previous energization of coil 17, energization of unit B rewind control coils MCR—6 is effected by the following circuit (right side of Fig. 16b):

*Relay coils MCR—6.*—From the + line, through coils MCR—6, contacts R—20b, contacts R—17e, contacts PC—r (unit B), contacts BC—F (unit B), normally closed R—27b contacts, to the — line.

Energization of a coil MCR—6 closes contacts MCR—6f to form the following circuit:

*Stick circuit: MCR—6.*—From the + line, through coils MCR—6, contacts MCR—6f, contacts PC—r (unit B), contacts BC—F (unit B), contacts R—27b, and to the — line.

With contacts R—25a closed, the rewind clutch solenoid 152a (see Figs. 3, 6, and 8) and rewind brush solenoid 191—R (also see Figs. 4 and 11), both of unit A, are simultaneously energized as follows (right side of Fig. 16b):

*Unit A—Rewind clutch and brush circuit.*— From the + line, through solenoids 152a and 191—R (unit A) in parallel, through a manual rewind switch RS—a, contacts R—25a, contacts PC—r (unit A), contacts BC—F (unit A), contacts R—28b, to the — line.

At the same time, with contacts MCR—6f closed, rewind clutch solenoid 152b and rewind brush solenoid 191—R (Figs. 3, 7, and 8) both of unit B are energized as follows (Fig. 16b):

*Unit B—Rewind clutch and brush circuit.*— From the + line, through solenoids 152b and 191—R (unit B) in parallel, through manual rewind switch RS—b, contacts MCR—6b, contacts PC—r (unit B), contacts BC—F (unit B), contacts R—27b, to the — line.

Energization of clutch solenoids 152a and b meshes driven clutch elements 95a and b, respectively, to driving clutch disks 84a and b of rewind shaft 70 (see Fig. 8) to cause rotation of front spool-drive shafts 85a and 85b. The latter shafts rotate the front spools 125—f of units A and B to cause the tapes T—a and T—b to be moved in a rewind direction (to the right, as viewed in Fig. 6).

Energization of brush solenoids 191—R of units A and B moves rewind brushes R of units A and B to tape-sensing position.

Thus far the following circuits, after closing of the motor circuits, were formed in the order stated below:

(1) MCR—1 and MCR—3.
(2) R—30 and R—31.
(3) R—16 and R—17.
(4) R—23 and R—24.
(5) MCR—2 and MCR—4.
(6) R—19 and R—20.
(7) MCR—6 and R—25.
(8) Rewind clutch and brush—units A and B.

When coil MCR—6 was energized to close contacts MCR—6f to form the rewind clutch and brush circuit of unit A, it also opened contacts MCR—6a in the stick circuit of coils R—30 and R—31 (Fig. 16a). Consequently, the latter coils are deenergized, causing contacts R—31a and R—31b to open and break the circuits of coils R—16 and R—17 (Fig. 16a).

With deenergization of coil R—16, contacts R—16c in the main circuit of coil R—23 (Fig. 16a) open. Also since coil R—25 has been energized, normally closed contacts R—25d in the stick circuit of coil R—23 have been opened. Thus, all circuit paths through coil R—23 having been opened, coil R—23 is deenergized.

Likewise, with deenergization of coil R—17, contacts R—17c open to break the main circuit path of coil R—24 (Fig. 16a) and with a coil MCR—6 now energized and holding contacts MCR—6c in the stick circuit of coil R—24 open, then coil R—24 is deenergized.

With deenergization of coil R—23, contacts R—23b in the circuit of coils MCR—2 (Fig. 16b) open, deenergizing the latter coils. Likewise, with deenergization of coil R—24, contacts R—24b in the circuit of coils MCR—4 (Fig. 16b) open deenergizing the latter coils.

Thus, due to energization of coils R—25 and MCR—6, deenergization of coils R—30, R—31, R—16, R—17, R—23, R—24, MCR—2, and MCR—4 has resulted, at the same time as the rewind clutch and brush circuits of units A and B were made. Only coils MCR—1, MCR—3, R—19, R—20, MCR—6, R—25, and the rewind clutch and brush solenoids are still energized at this time to effect rewinding of tapes T—a and T—b.

*Paragraph selection during rewind*

In the chosen example, dials D—1, D—2, D—3, and D—4 are set respectively to choose paragraphs 8 (T—a), 4 (T—b), 15 (T—a), and 17 (T—b). The first paragraph to be typed is paragraph 8 of tape T—a. The code for paragraph 8 is a combination of perforations in the 8 and 9 index positions of a column (see Fig. 15):

Considering unit A, assume the paragraph 8 code column is in advance of the now active rewind brushes R, that is to the left (Fig. 6) of the brushes. The tape T—a is now being fed in a rewind direction, from left to right. Consequently, before the tape is completely rewound on its front spool 125—f, the paragraph 8 column reaches the sensing line of brushes R. When this happens, the following circuit is formed (Fig. 16c):

*Unit A: Coil R—28—paragraph selection by dial D—1*

From the + line, through relay coil R—28, back switch blade 220' of dial D—1, the "8" contact stud 216' (to which blade 220' has been adjusted), line 233, line 234, the normally closed points of transfer relay contacts c (5) of coil MCR—2 (now deenergized), the normally open points of transfer relay contacts c (5) of coil MCR—1, now closed due to energization of coil MCR—1, the brush R (8), the contact roller 80a (engaged by the brush through a perforation in the "8" index position), the brush R (9) sensing the contact roller through the "9" index position perforation, the left side of transfer contacts c (6) of coil MCR—1, the closed, left, side of transfer switch c (6) of coil MCR—2, line 235, the jumper 236, the front contact stud 216 (8) of dial D—1, the front switch blade 220, and to the — line.

The result of above circuit is to energize coil R—28 as the "8" paragraph code column of tape T—a reaches the brushes R of unit A during tape rewinding. Energization of coil R—28 opens contacts R—28b (Fig. 16b) in the clutch and brush rewind circuit of unit A, causing the tape to stop its rewind movement with the paragraph "8" code column under brushes R and past the forward brushes F (Fig. 6). The paragraph "8" coded data is now to the right of and past brushes F. The 8 (T—a) paragraph has thus been selected, ready to be transcribed by the typewriter, as will be presently explained.

Opening of contacts R—28b also breaks the stick circuit of coil R—25, causing deenergization of the latter.

Further coil R—28 has closed contacts R—28a to form the following circuit (left side of Fig. 16b):

*Relay coils MCR—8.*—From the + line, through coils MCR—8, contacts R—28a, normally closed contacts R—16a, to the — line.

A coil MCR—8 closes contacts MCR—8a, to form the following stick circuit:

*Stick circuit: MCR—8.*—From the + line, through coils MCR—8, contacts MCR—8a, contacts R—16a, to the — line.

Energization of a coil MCR—8 opens contacts MCR—8b, breaking the circuit of coil MCR—1 (middle of Fig. 16b).

Further, energization of a coil MCR—8 closes contacts MCR—8c to make the following circuit (right side of Fig. 16a):

*Relay coil R—13.*—From the + line, through coil R—13, contacts MCR—8c, to the — line.

Thus, due to energization of coil R—28 by the unit A, dial D—1 paragraph selecting circuit established during rewinding feed of the tape T—a, the rewind clutch and brush circuit of unit A has been broken, causing the tape to come to rest and brushes R to return to inactive position, coils R—25 and MCR—1 have been deenergized, and coils MCR—8 and R—13 have been energized.

At the same time as tape T—a is being rewound, tape T—b is also being rewound.

Considering unit B, the "4" paragraph is to be selected. The code for paragraph 4 is 6—10 (see Fig. 15). The column of tape T—b containing this paragraph code may be in advance of the rewind brushes R of unit B, just as the "8" paragraph of tape T—a was assumed to be in advance of the rewind brushes of unit A. With the "4" paragraph column of tape T—b in advance of the rewind brushes, the paragraph colwill reach the brushes during the movement of the tape in the rewind direction. When brushes R sense the 6—10 perforations representing paragraph 4, then a circuit will be formed as follows (Fig. 16c):

*Unit B: Coil R—27—paragraph selection by dial D—2*

From the + line, through coil R—27, line 238, the back switch blade of dial D—2, the "4" back contact stud, line 239, the normally closed, left side of transfer point c (3) of coil MCR—4 (now deenergized), the left (now closed) side of transfer contacts c (3) of coil MCR—3 (now energized), rewind brush R (6), contact roller 80b, rewind brush R (10), the left side of relay contacts c (7) of coil MCR—3, the left side of contacts c (7) of coil MCR—4, line 240, jumper 241 to the front "4" contact stud of dial D—2, the front switch blade of dial D—2, and to the — line.

As a result of energization of coil R—27, contacts R—27b (Fig. 16b) in the unit B rewind clutch and brush circuit open, causing the rewinding of tape T—b to stop and brushes R of unit B to rise to inactive position.

Opening of contacts R—27b also breaks the circuit of coils MCR—6 (Fig. 16b).

Coil R—27 also closes contacts R—27a to form the following circuit (left side of Fig. 16b):

*Relay coils MCR—9.*—From the + line, through coils MCR—9, contacts R—27a, normally closed contacts R—17a (coil R—17 is now deenergized), to the — line.

A coil MCR—9 closes contacts MCR—9a to form the following stick circuit:

*Stick circuit: MCR—9.*—From the + line, through coils MCR—9a, contacts MCR—9a, contacts R—17a, to the — line.

Energization of a coil MCR—9 opens contacts MCR—9c in the circuit of coils MCR—3 (Fig. 16b), deenergizing the latter.

Further, a coil MCR—9 closes contacts MCR—9b to make the following circuit (right side of Fig. 16a):

*Relay coil R—14.*—From the + line, through coil R—14, contacts MCR—9b, to the — line.

Thus, due to energization of coil R—27 by the unit B paragraph selection circuit made during rewind operation, the rewind clutch and brush circuit of unit B has been opened, causing the tape to come to rest and brushes R to return to inactive position, coils MCR—6 and MCR—3 have been deenergized, and coils MCR—9 and R—14 have been energized.

Either the selected paragraph of tape T—a or the selected paragraph of tape T—b may come to control position first, depending on which is nearer the brushes R at the initiation of the rewind feeds of both tapes.

Nothing further will happen now till the start key ST (see Fig. 2 and right center of Fig. 16a) is depressed.

It has been assumed that the first paragraphs to be selected from tapes T—a and T—b, i. e., paragraphs 8 (T—a) and 4 (T—b) were in advance of the rewind brushes R as the rewind operation began. It may be, however, that initially one or both of the above paragraphs are past the rewind brushes; that is, to the right (Fig. 6) of the brushes. Assume, for instance that paragraph 8 (T—a) is past the rewind brushes. It will be recalled that at the beginning of the rewind operation, coils MCR—1, MCR—3, MCR—6, R—19, R—20, R—25, and the clutch and brush rewind coils of units A and B are energized. Now, with paragraph 8 of tape T—a initially past or to the right of the brushes R, then brushes R will not sense the paragraph 8 code column of the tape during rewind. The tape will continue to rewind on its front spool until the size of the tape roll on the rear spool is diminished to such an extent as to cause contacts PC—r of unit A to open.

Opening of contacts PC—r of unit A breaks the circuit of coil R—25 (Fig. 16b), and the rewind clutch and brush circuit of unit A, causing the tape rewind drive to cease and the brushes R to rise to inactive position.

Nothing further will happen now with respect to unit A until the start key is depressed.

Similarly, with respect to unit B, if the paragraph to be selected is past rewind brushes R, tape T—b will rewind until contacts PC—r of unit B open to break the rewind clutch and brush circuit of this unit, as well as the circuit of coils MCR—6.

Assume that paragraph 8 (T—a) was past the brushes R so as not to be sensed by the latter during rewind, with the result that tape T—a has been fully rewound, contacts PC—r (unit A) opened, and the circuits of coil R—25 and of rewind clutch and brush solenoids of unit A broken. Assume further that paragraph 4 (T—b) was in advance of brushes R which have sensed the chosen paragraph 4 code, causing energization of coil R—27, with the result that the rewind clutch and brush solenoids 152b and 191—R respectively, have been deenergized to cause tape T—b to come to rest with the paragraph 4 code column below brushes R (unit B) which have now returned to inactive position. In addition, coils MCR—3 and MCR—6 have been deenergized, and coils MCR—9 and R—14 energized, as previously explained. At this time, then, under the stated conditions, coils MCR—1, MCR—9, R—14, R—19, and R—20 are energized.

The operator now depresses the start key ST to close contacts ST', establishing the following circuit (right hand portion of Fig. 16a):

*Start circuit: Relay coil R—15.*—From the + line, through coil R—15, contacts ST', to the — line.

Coil R—15 closes contacts R—15a to form the following stick circuit:

*Stick circuit: R—15.*—From the + line, through contacts R—15a, normally closed R—18a contacts, normally closed contacts R—30b (coil R—30 has been deenergized), normally closed MCR—6e contacts (coil MCR—6 has been deenergized), normally closed R—26a contacts, to the — line.

Energization of coil R—15 also closes contacts R—15b to form the following circuit (middle of Fig. 16b):

*Unit B read brush positioning circuit.*—From the + line, through solenoid 191—F of unit B, front paper roll-controlled contacts PC—f of unit B, rewind brush holder-controlled contacts BC—R of unit B, normally closed contacts MCR—6b, contacts R—15b, to the — line.

Energization of solenoid 191—F of unit B places forward or read brushes F of unit B in active position.

However, the tape T—b still remains at rest with its paragraph 4 code column below brushes R where it stopped when sensed during the rewind operation. The tape T—b cannot start its feed in a reading direction until the selected paragraph of tape T—a has first been found and transcribed, as will be made clear later. The tape T—a is at this time in fully rewound condition.

When coil R—15 was energized as a result of depression of the start key circuit, contacts R—15b closed to form the unit B read brush positioning circuit. Further, since rewind control coil R—25 of unit A has been deenergized, contacts R—25c are now closed and with closing of contacts R—15b, the following circuit is formed (middle of Fig. 16b):

*Unit A read brush positioning circuit.*—From the + line, through solenoid 191—F of unit A, contacts PC—f and contacts BC—R of unit A, contacts R—25c, contacts R—15b, to the — line.

Energization of solenoid 191—F of unit A positions brushes F of this unit in operative tape-sensing position.

At the same time as above circuit is formed, the following circuit is also formed (Fig. 16a):

*Unit A finder clutch circuit.*—From the + line, through clutch solenoid 158a (see Figs. 6 and 11), normally closed relay points R—13a, contacts PC—f and BC—R of unit A, contacts R—25c, contacts R—15b, to the — line.

Solenoid 158a meshes driven clutch disk 94a to driving clutch disk 82a of find shaft 67 (see Fig. 3), and rear spool-drive shaft 83a starts rotating to turn the rear spool 125—r of unit A in a clockwise direction (Fig. 6) to feed the tape to the left or in a reading direction.

Brushes F are now in active position and sensing the tape T—a now being moved by the find shaft 67 in the reading direction. During feed of the tape in the reading direction, the paragraph 8 (T—a) code column reaches brushes F, causing the completion of the unit A: Coil R—28—paragraph selection by dial D—1 circuit, traced previously, but with this sole difference that instead of the circuit being made through brushes R sensing the code perforations, the circuit is made through brushes F (Fig. 16c) sensing the perforations, it being recalled that brushes F and R are conductively connected to each other by bridging plates 171 (see Figs. 3, 6, 8, and 11).

As a result of this selection circuit, coil R—28 is energized, which, as previously described, closes contacts 28a to form the circuit of coils MCR—8 (Fig. 16b), which in turn, opens contacts MCR—8b to break the circuit of coils MCR—1 (Fig. 16b) and closes contacts MCR—8c to make the circuit of coil R—13 (Fig. 16a).

Energization of coil R—13 opens relay points R—13a, breaking the circuit of unit A finder clutch solenoid 158a (Fig. 16b), and as a result, the finder shaft 67 ceases to drive the tape in the reading direction. At the same time as relay points R—13a open, the alternate points R—13a' close to establish the following circuit (Fig. 16a):

*Unit A read clutch circuit.*—From the + line, through read clutch solenoid 159a, normally closed MCR—5c contacts, contacts R—13a', contacts PC—f, contacts BC—R, contacts R—25c, and contacts R—15b, to the — line.

Energization of solenoid 159a causes the contact roller 80a to be clutched to read shaft 73 and also causes the rear spool-drive shaft 83a to be driven through the aforementioned slip drive transmission by the read shaft. The tape is now fed in the reading direction at a rate paced by roller 80a, this rate being about one-eighth of the speed of the tape during rewind shaft drive or find shaft drive, as previously explained.

Thus, upon the finding of the selected paragraph 8 (T—a) during the feed of the tape by the find shaft, the drive of the tape in the reading direction is transferred from the find shaft 67 to the slower read shaft 73.

Meanwhile tape T—b is still at rest with the selected paragraph 4 code column below brushes R, where it will remain until the paragraph selected on tape T—a has been completely transcribed by the typewriter.

*Tape data reading.*—At the time the feed of the tape T—a is transferred from the find shaft 67 to the read shaft 73, the selected paragraph code is under brushes F. The rest of the selected paragraph is to the right (Fig. 6) of these brushes and will reach the brushes during feed of the tape to the left by the read shaft.

The first designation, following the paragraph code designation, is a start reading code, 2—3—10 (Fig. 15). When this code reaches brushes F, the following analyzing circuits are established (Fig. 16c):

*Unit A analyzing circuit: Code relay coil R—2.*—From the + line, through coil R—2, the normally closed side of a pair of transfer points d (2) of coil MCR—5 (now deenergized), unit A brush F (2), contact roller 80a, common return brush F (c), contacts R—13b (coil R—13 has been energized), circuit breaker contacts CB—a (also see Figs. 3 and 6), to the — line.

A similar analyzing circuit will be formed by the sensing of the 3 perforation by unit A brush F (3) to energize code coils R—3 and R—3' in series.

Due to the unit A brush F (10) sensing a 10 perforation, another analyzing circuit will form through code coil R—10.

The analyzing circuits of code coils R—1 to R—3 and R—3', as indicated in the tracing of the coil R—2 circuit, go directly from the d contacts of coil MCR—5 to the sensing brushes F. The analyzing circuits of code coils R—4 to R—10 differ from the analyzing circuits of the other coils in extending from the d contacts of coil MCR—5 through the normally closed sides of the c contacts of coils MCR—1 or MCR—3 (depending on the condition of the MCR—5d contacts) to the sensing brushes. The purpose of routing the analyzing circuits of coils R—4 to 10 through the normally closed c contacts of coils MCR—1 or MCR—3 is to prevent control circuits being formed through perforations 4 to 10 during paragraph selection. All of the codes (see Fig. 15) include one of the 4 to 10 perforations, and unless an analyzing circuit can be traced through a 4 to 10 perforation, a code transcription will not take place. During paragraph selection from tape T—a, coil MCR—1 is energized to open the normally closed sides of its c contacts and during paragraph selection from tape T—b, coil MCR—3 is energized to open the normally closed sides of its c contacts. Thus, during paragraph selections, analyzing circuits cannot be formed through any of coils R—4 to 10, thereby preventing transcription of a data or special code, except a paragraph code, until a paragraph has first been selected and coils MCR—1 and/or MCR—3 deenergized. Thus, the normally closed sides of contacts c of coils MCR—1 and MCR—3 serve as safety contacts, supplementing the return line contacts R—13b and R—14b in preventing formation of analyzing circuits during paragraph selection.

Continuing with the sensing on tape T—a of a start reading code 2—3—10, analyzing circuits have been completed for energizing coils R—2, R—3, R—3', and R—10.

Coils R—2 and R—3 respectively close relay points R—2a and R—3a of the 2—3 zone line (Fig. 16b) in the code translating unit and coil R—10 (see lower right of Fig. 16a) closes contacts a of the R—10 contact group to close a path for a relay coil R—21 leading to the 2—3 zone line. The circuit of coil R—21 is as follows:

*Coil R—21.*—From the + line (Fig. 16b), through wire 245 (right hand line of Fig. 16b), lead 246 (follow through to Fig. 16a), the a contacts of coil R—10, coil R—21, the 2—3 zone line (Fig. 16b), contacts R—2a, contacts R—3a, normally closed R—1a' contacts, line 247, and to the — line.

Coil R—21 is the pick-up coil of a duo-wound relay magnet of which coil R—21H (left side of Fig. 16a) is the holding coil.

Energization of pick-up coil R—21 closes contacts R—21a (see Fig. 16) to form a circuit through holding coil R—21H as follows:

*Coil R—21H.*—From the + line, through coil R—21H, contacts R—21a, normally closed R—16b and R—17b contacts, to the — line.

Coil R—21H now holds contacts R—21a closed, so that although coil R—21 is deenergized as the start read code on the tape departs from the brushes F, coil R—21H remains energized until normally closed contacts R—16b and R—17b open.

Coil R—21H maintains relay contacts R—21b (middle of Fig. 16b) and contacts R—21c (bottom of Fig. 16b) closed. One blade of contacts R—21b is connected by line 245 (Fig. 16b, right hand line) to the + line while the other blade of contacts R—21b is connected to the common line 250 of the groups of contacts of the code translating relay coils R—4 to R—10. Contacts R—21c are in the numerical (3 to 9) zone line. Now, with these contacts R—21b and R—21c closed as a result of the start read code, translating circuits may be formed to translate the codes sensed by brushes F into functions of the typewriter.

The letter sheet has been placed in the typewriter and the date, inside address, and salutation typed in.

Following the start reading code of the paragraph on the tape, the next code to reach the brushes is, for instance, a carriage return code 2—3—6 (Fig. 15). When brushes F sense this code, analyzing circuits are formed through code coils R—2, R—3, R—3', and R—6. Coils R—2 and R—3 close the 2—3 zone line (Fig. 16b), while coil R—6 closes the a points of the R—6 group of contacts in the translating unit, causing the following circuit to form (Fig. 16b):

*Carriage return.*—From the + line, through wire 245, contacts R—21b, bus bar 250, points a of the R—6 group, the carriage return solenoid 45—CR, the 2—3 zone line, and, as in the coil R—21 circuit previously traced, to the — line.

Energization of solenoid 45—CR operates the carriage return key CR, as explained in the description of the typewriter. The typewriter carriage C (Fig. 14) now returns to the beginning of the line position and, as an incident thereto, a line spacing operation is effected in the usual manner. If desired, several carriage return codes may be punched in succession in the tape to cause plural line spacing.

Preferably, following the carriage return code, the tape has a tabular code 2—3—7. When this code is sensed by brushes F, coils R—2, R—3, and R—7 are energized. Coils R—2 and R—3 close the 2—3 zone line, and coil R—7 closes the a points of the R—7 group of translating contacts to close a branch line, through solenoid 45—Tab, to the 2—3 zone line. Energization of solenoid 45—Tab results, and the solenoid operates the key Tab to effect a marginal spacing of the sheet. The sheet is then in position to have the first letter of the first paragraph typed in.

Assume, as is probable, that the first letter is to be capitalized. Accordingly, following the tabular code, the tape will be punched with a shift code 1—2—3—4 (Fig. 15). Sensing of this code by brushes F causes energization of coils R—1, R—2, R—3, R—3', and R—4.

Coil R—1 opens contacts R—1a' in the 2—3 zone line. Coil R—3' opens contacts R—3'a in the 1—2 zone line. Coil R—2 opens contacts R—2b' in the 1—3 zone line. Coil R—3' opens contacts R—3'b' in the 1 zone line. Coil R—3 opens contacts R—3a' in the 2 zone line. Coil R—2 opens contacts R—2a' in the 3 zone line. Coil R—3 opens contacts R—3b' in the numerical (3—9) zone line.

Coil R—3' also has closed contacts R—3'c and coil R—4 has closed the a points of the R—4 contact group, closing a circuit through the pick-up coil R—12 of a duo-wound relay, as follows (Fig. 16b):

*Pick-up coil R—12.*—From the + line, through line 245, contacts R—21b, bus bar 250, points a of the R—4 group, shift initiating coil R—12, points R—3'c, R—2b, R—1a, to the — line.

Coil R—12 closes contacts R—12a to form the following circuit (left side of Fig. 16a):

*Shift key solenoid.*—From the + line, through contacts R—12a, coil R—12H and shift solenoid 45—SH in parallel, through normally closed R—34a contacts, to the — line.

This circuit energizes solenoid 45—SK to depress the case shift key SH to shift the type to capital case position. Coil R—12H keeps contact 12a closed to maintain solenoid 45—SH energized and the type in capital case position during the typing of the characters which are to be capitalized. The codes for these characters are punched in the tape columns following the shift code. Following the last character of the series to be capitalized, the tape has a shift return code 2—3—5 (Fig. 15).

The analysis of the 2 and 3 perforations energizes coils R—2 and R—3 which close the 2—3 zone line (Fig. 16b). Analysis of the 5 perforation energizes coil R—5 which closes the group of R—5 contacts including points a, thereby completing a branch line through relay coil R—34 to the 2—3 zone line. As a result, coil R—34 is energized to open contacts R—34a of the shift key solenoid circuit. The coil R—12H and solenoid 45—SH are thereby deenergized, causing the shift key to return to normal and the type to revert to lower case position.

The tape continues to feed past the brushes F and the data of the selected paragraph is transcribed by the typewriter. If manual insertion of any matter, as a name or date, is required intermediate the paragraph being transcribed from the tape, the latter is punched with a "manual insertion" code 2—3—9 (Fig. 14). Analysis of this code energizes coils R—2, R—3 and 3', and R—9. Coils R—2 and R—3 close the 2—3 zone line and coil R—9 closes the a points of the R—9 group (Fig. 16b) to complete a branch line through a relay coil R—26 to the 2—3 zone line.

Energization of coil R—26 opens contacts R—26a in the stick circuit of coil R—15 (right center of Fig. 16a) to cause deenergization of the latter. Deenergization of coil R—15 opens contacts R—15b to break the Unit A read brush positioning circuit and read clutch circuit (right center of Fig. 15b) causing the tape to stop feeding and the brushes F to rise to inactive position. The operator now types in the matter required to be inserted. When this has been done, start key ST is again depressed, initiating energization of coil R—15 which is then held by the closing of contacts R—15a. Contacts R—15b close again and the read brush and clutch circuits again make to resume feeding and sensing of the coded data.

Interruption of the tape reading operation may also be effected by depressing a stop key SK (right center of Fig. 16a), to form a circuit through a relay coil R—18. Coil R—18 opens contacts 18a in the stick circuit of coil R—15 which opens contacts R—15b to break the Unit A read clutch circuit and read brush positioning circuit.

The manner in which any key operating solenoid 45 is energized by sensing of the corresponding code is believed clear from the previous tracing of some of the code translating circuits. In short, the energization of the zone code coils R—1, R—2, and R—3 and R—3' singly or in combination, closes the proper zone line and the energization of the interzone coil R—4 to R—10 closes a branch line to the zone line through the solenoid 45 corresponding to the code. For instance, all the 2—3 zone codes cause closing of the 2—3 zone line, the 1—2 zone codes close the 1—2 zone line, and so on, while the branch line closed to the zone line depends on the interzone code perforation 4 to 10 and includes the solenoid 45 corresponding to the code.

The last code contained in any tape paragraph is an "end of paragraph" code 2—3—8. Sensing of this code energizes coils R—2, R—3 and 3', and R—8. The 2—3 zone line is closed and the *a* points of the R—8 group close to route the translating circuit through a relay coil R—33 (Fig. 16b).

Energization of coil R—33 closes contact 33b to form the following circuit (middle of Fig. 16a):

Coil R—16—Alternate circuit.—From the + line, through coil R—16, normally closed MCR—5a points, contacts R—33b, to the — line.

Coil R—16, being energized, opens contacts R—16a to break the MCR—8 circuit (left side of Fig. 16b), and the latter coil is deenergized.

Further, coil R—16 opens contacts R—16b to break the holding circuit of coil R—21H (left side of Fig. 16a), deenergization of which opens contacts R—21b and c of the translating unit (Fig. 16b) to prevent formation of code translating circuits.

Also, coil R—16 closes contacts R—16c to reestablish the coil R—23 circuit (left center of Fig. 16a).

With coil MCR—8 deenergized, contacts MCR—8c open to break the circuit of coil R—13 (right side of Fig. 16a). Contacts R—13b thereupon open to break the return path for the analyzing circuits of unit A (see lower left side of Fig. 16c). Also contacts R—13a' break the unit A read clutch circuit (right center of Fig. 16b), and opposite contacts R—13a close to reestablish the Unit A find clutch circuit. The find shaft 67 now takes over the feed of tape T—a in a reading direction and brushes F remain active so as to sense the next paragraph code to be selected.

Further, as coil MCR—8 was deenergized, contacts MCR—8b closed to reestablish the coil MCR—1 circuit (middle of Fig. 16b). Coils MCR—1 close contacts MCR—1b and as coil R—23 has been energized to close contacts R—23b, the circuit of coil MCR—2 (middle of Fig. 16b) is made again.

When coil R—33 was energized by the "end of the paragraph" code, it also closed contacts R—33a to form the following circuit (left portion of Fig. 16b):

Coil R—35.—From the + line, through coil R—35, contacts R—33a, to the — line.

Coil R—35 closes contacts 35a to form the following stick circuit:

Stick circuit—Coil R—35.—From the + line, through coil R—35, contacts R—35a, normally closed R—17d contacts, to the — line.

Coil R—35 also closes contacts R—35b to form the following circuit (Fig. 16b):

Coils MCR—5.—From the + line, through coils MCR—5, contacts R—35b, to the — line.

At this time, then, due to the occurrence of the "end of paragraph" code at the end of the first paragraph of tape T—a which has been transcribed, coils MCR—1, MCR—2, R—16, R—23, R—35, and MCR—5 have been energized.

It will be recalled that paragraph 4 of tape T—b has already been selected by dial D—2 and that tape T—b has been at rest during transcription of data from tape T—a and that the selected paragraph code of tape T—b has been all this time under the rewind brushes R of unit B. Further, due to finding of the tape T—b paragraph, coils MCR—9 and R—14 are still energized, as previously explained. In addition, coils R—19 and R—20 remain energized.

When coils MCR—5 are energized, they open contacts MCR—5a to break the alternate circuit of coil R—16 (Fig. 16a) deenergizing the latter, and close opposite contacts MCR—5a' in series with coil R—17, preparing the latter for energization upon the occurrence of the next end of paragraph code.

Coils MCR—5 also open contacts MCR—5c in the circuit of Unit A read clutch solenoid 159a (Fig. 16b) so as to prevent continuation of the feed of the tape T—a after the second paragraph 15 to be transcribed therefrom has been found during feed of the tape by the find shaft 67.

Further, coils MCR—5 close contacts MCR—5b in series with the read clutch solenoid 159b (Fig. 16b) of unit B. Since coil R—14 is now energized and contacts R—14a' closed, the circuit of read clutch solenoid 159b is completed as follows:

Unit B read clutch.—From the + line, through coil 159b, contacts MCR—5b, contacts R—14a', paper roll contacts PC—f and brush holder contacts BC—R of unit B, contacts MCR—6b, contacts R—15b, to the — line.

The read brush solenoid 191—F of unit B already has been energized, as previously described, and now as tape T—b feeds in the forward direction, brushes F are ready to sense the code combinations of paragraph 4 (T—b) selected under control of dial D—2, as previously explained.

It is clear now that after tape T—b has been brought to a position in which the paragraph selected by dial D—2 is ready to be read out, that the latter tape remains in this position until after the paragraph of tape T—a selected by dial D—1 has been read out and transcribed by the typewriter.

Now, tape T—a is being moved in the reading direction by finder shaft 67 and tape T—b is being moved by the read shaft 73 to have its selected paragraph read out by the brushes F of unit B.

The code coils R—1 to R—10 are common to the analyzing means of units A and B and the determination of which of these units is to control the code coils depends on the condition of the d contacts of coils MCR—5 (left side of Fig. 16c). The normally closed sides of these d contacts lead to unit A and the normally open sides to unit B analyzing means. While tape T—a data is being transcribed, as explained, the coils MCR—5 are deenergized, and the normally closed sides of the d contacts remain effective to control coils R—1 to R—10 by the unit A brushes. Now, preparatory to transcribing data from tape T—a, the coils MCR—5 have been energized. The latter, when energized, close the normally open points of transfer relay contacts d and open the normally closed points of these transfer contacts. The analyzing circuits of code coils R—1 to R—10 can now be made only through brushes F sensing combinations in tape T—b.

The return path of the unit B analyzing circuits includes contacts R—14b (Fig. 16c) which are now closed as a result of continued energization of coil R—14.

In a manner similar to that explained in connection with the transcribing of the first paragraph of the letter from tape T—a, the second paragraph of the letter is now being transcribed from tape T—b.

During the transcription of the second paragraph of the letter from tape T—b, the third paragraph to be transcribed as being sought on tape T—a. The latter tape is now being moved by finder shaft 67 in a reading direction and brushes F are sensing the tape. Coils MCR—1 and MCR—2 are energized. The third paragraph of the letter is paragraph 15 of tape T—a, which has been chosen by the setting of dial D—3. The paragraph 15 code is 4—10 (Fig. 15). When this code is sensed by brushes F, the following circuit is completed (Fig. 16c):

Unit A—Paragraph selection by dial D—3.—From the + line, through coil R—28, the back switch blade 220' of dial D—3, the "15" contact stud engaged therewith, line 253, the right side of transfer switch c (1) of coil MCR—2 (now energized) the left side of contacts c (1) of coil MCR—1 (also energized), brush R (4), connector 171, brush F (4), contact roller 80a, brush F (10), connector 171, brush R (10), the left side of contacts c (7) of coil MCR—1, the right side of contacts c (7) of coil MCR—2, line 254, the front "15" contact stud of dial D—3, the front switch blade of this dial, and to the — line.

Energization of coil R—28 closes contacts R—28a to re-make the circuit of coils MCR—8 (Fig. 16b), which, in turn, open contacts MCR—8b to break the circuits of coils MCR—1 and MCR—2. Also, coil R—13 (Fig. 16a) is again energized by the closing of contacts MCR—8c. Coil R—13 opens points R—13a to break the finder clutch circuit of unit A (Fig. 16b), thereby causing feed of tape T—a to stop. Since coils MCR—5 are now energized, contacts MCR—5c in the circuit of the read clutch solenoid 15a of unit A are now open, so that although contacts R—13a' are closed, the read clutch solenoid is not energized at this time.

The third paragraph of the letter has now been selected by dial D—3 for transcription from paragraph 15 of tape T—a. Meanwhile, the second paragraph of the letter is being typed under control of paragraph 4 of tape T—b. At the end of paragraph 4 is an "end of paragraph" code. In the manner previously described, analysis of this code results in energization of code translating relay coil R—33 (Fig. 16b) to close contacts R—33b in the common return line of relays R—16 and R—17 (Fig. 16a). Since contacts MCR—5a' have been closed and contacts MCR—5a have been opened, as previously explained, the alternate R—16 circuit, previously traced, cannot be made but the alternate R—17 circuit is made as follows (Fig. 16a):

Coil R—17—Alternate circuit.—From the + line, through coil R—17, contacts MCR—5a', contacts R—33b, to the — line.

Coil R—17, being energized, opens contacts 17a in the return line of coils MCR—9 (Fig. 16b) deenergizing the latter.

Coil R—17 also closes contacts R—17c to re-establish the circuit of coil R—24 (Fig. 16a), which is then held energized by the stick circuit going through contacts R—24a and MCR—6c (Fig. 16), as previously traced.

Coil R—17 also opens contacts R—17d in the stick circuit of coil R—35 (Fig. 16b), the main circuit of which is formed through "end of paragraph" relay points R—33a. When the "end of paragraph" code column of the tape T—b paragraph, just transcribed, passes brushes F, coil R—33 is deenergized and contacts R—33b open to break the alternate circuit of coil R—17, while contacts R—33a open to break the main circuit of coil R—35. Coil R—17 is slower acting than coil R—35 so that before contacts R—17d can close as a result of deenergization of coil R—17, coil R—35 has been deenergized and stick circuit contacts R—35a have opened. Thus, by the time contacts R—17d re-close, the stick circuit of coils R—35 cannot be made. As a result, coil R—35 is deenergized and relay contacts R—35b open to break the circuit of the MCR—5 coils (Fig. 16b). Coils MCR—5, being deenergized, contacts MCR—5a' open and contacts MCR—5a close to prepare coil R—16 (Fig. 16a) for energization upon the occurrence of the next "end of paragraph" code.

Further, contacts MCR—5b open to break the read clutch circuit (Fig. 16b) of unit B.

Coils MCR—9 (Fig. 16b) having been deenergized at the time contacts R—17a opened, contacts MCR—9b open to break the circuit of coil R—14 (Fig. 16a). Contacts R—14a thereupon close to complete the find clutch circuit of unit B (Fig. 16b), so that tape T—b is now fed by operation of the finder shaft 67 in a reading direction for brushes F of unit B to find the next paragraph, which is 17 (T—b).

Also, deenergization of coil R—14 causes contacts R—14b in the common return line of the analyzing circuits of unit B to open.

Further, deenergization of coils MCR—5 permitted closing of contacts MCR—5c in series with the read clutch solenoid 159a of unit A. Also, since coil R—13 is now energized as a consequence of the finding of the selected paragraph 15 (T—a), contacts R—13a' are closed, so that the read clutch circuit of unit A is completed. Tape T—a is now fed by read shaft 73 to have its second selected paragraph sensed by brushes F and translated into operation of the typewriter. When coils MCR—5 were deenergized, the d group (Fig. 16c) of MCR—5 contacts returned to normal condition, placing code coils R—1 to R—10 under control of the analyzing means of unit A.

The third paragraph of the letter is now transcribed from the selected paragraph "15" of tape T—a in the same manner as previously indicated with respect to the first paragraph of the letter.

While this is being done, the fourth paragraph "17" is being sought on tape T—b.

When coils MCR—9 were deenergized, contacts MCR—9c closed to re-form the circuit of coils MCR—3 (Fig. 16b). Coils MCR—3 close contacts MCR—3a in series with coils MCR—4. Now, coil R—24 has been energized, as previously explained, so that it closes contacts 24b, which completes the circuit of coils MCR—4.

With coils MCR—3 and MCR—4 energized, the second selection of a paragraph (17) from tape T—b takes place under control of dial D—4. When the paragraph 17 code 5—7 (Fig. 15) is sensed by brushes F during the finder feed of the tape, the following circuit is formed (Fig. 16c):

*Unit B: coil R—27—Paragraph selection by dial D—4.*—From the + line, through coil R—27, the back switch blade of dial D—4, the back "17" contact stud, line 256, the right side of relay contacts c (2) of coils MCR—4 (now energized), the left side of contacts c (2) of coils MCR—3 (now energized), the brush R (5), connector 171, brush F (5) contact roller 80b, brush F (7), connector 171, brush R (7), the left side of contacts c (4) of coils MCR—3, the right side of contacts c (4) of coils MCR—4, line 257, jumper 258 to the front "17" contact stud of dial D—4, the front switch blade of this dial, and to the − line.

Energization of coil R—27 closes contacts R—27a to reestablish the circuit of coils MCR—9 (Fig. 16b), which open contacts MCR—9c to break the circuits of coils MCR—3 and MCR—4.

Coils MCR—9 also close contacts MCR—9b to re-form the circuit of coil R—14 (Fig. 16a). Coil R—14 opens contacts 14a and closes contacts 14a' to transfer the feed of the tape T—b from the finder clutch circuit to the reading clutch circuit of unit B (Fig. 16b). However, the reading clutch circuit is not yet completed because of contacts MCR—5b being open. Tape T—b accordingly remains at rest with its selected paragraph ready to be read out. The tape T—b will remain in this position until the previous paragraph now being read out of tape T—a is completely transcribed by the typewriter.

When the third paragraph of the letter has been transcribed from paragraph 15 of tape T—a, the last designation of the tape paragraph which is an "end of paragraph" combination reaches brushes F of unit A. This causes energization of code translating coil R—33 (Fig. 16b) which closes contacts R—33b and with contacts MCR—5a now closed, the circuit of coil R—16 (Fig. 16a) is completed. Also, contacts R—33a close to remake the main circuit of coil R—35 (Fig. 16b), which is held energized by the stick circuit completed by the closing of contacts R—35a.

Coil R—35 closes contacts 35b to reestablish the circuit of coils MCR—5 (Fig. 16b), which shift the d group of contacts (Fig. 16c) to transfer the control of code coils R—1 to R—10 to the analyzing means of unit B.

Also, coils MCR—5 open contacts MCR—5c to break the read clutch circuit (Fig. 16b) of unit A, while contacts MCR—5b close to complete the read clutch circuit (Fig. 16b) of unit B. Tape T—b is now fed by the read shaft 73 and its selected paragraph 17 transcribed as the fourth paragraph of the letter.

When coil R—16 was energized by the paragraph end code at the end of the paragraph just transcribed from tape T—a, contacts R—16a opened to break the circuit of coils MCR—8 (Fig. 16b). Contacts MCR—8c then open to break the circuit of coil R—13 (Fig. 16a), which caused contacts 13a to re-close and complete the find clutch circuit (Fig. 16b) of unit A. Accordingly, tape T—a is now being driven rapidly by the find shaft 67 in a reading direction while the last paragraph of the letter is being typed under control of paragraph 17 of tape T—b selected by dial D—4.

Further, with coils MCR—8 deenergized, contacts MCR—8b close to reestablish the circuits of coils MCR—1 and MCR—2 (Fig. 16b).

The two paragraphs 8 and 15 of tape T—a have already been selected and transcribed. Paragraph 15 (T—a) has completely passed brushes F of unit A, and tape T—a is continuing its feed in the reading direction, with find shaft 67 now effecting the feed. Regardless of the setting of the c points (Fig. 16c) of coils MCR—1 and MCR—2, a further paragraph selection from tape T—a cannot now be made since paragraphs 8 and 15 for which the dials D—1 and D—3 are set have both passed the brushes F and the code for these paragraphs cannot be sensed by the brushes. Accordingly while the fourth paragraph of the letter is being typed under control of tape T—b, tape T—a continues to be fed in the reading direction by find shaft 67 until the size of the roll on front spool 125—f of unit A is diminished to such an extent as to cause contacts PC—f of unit A to open (see Fig. 6).

When contacts PC—f (unit A) open, the find clutch circuit and the read brush positioning circuit (Fig. 16b) of unit A are opened. The find shaft feed of tape T—a thereupon stops and brushes F rise to inactive position. When brushes F rise, brush holder contacts BC—F of unit A close, ready to complete the rewind clutch and brush circuits (Fig. 16b) of unit A and the circuit of unit A rewind control coil R—25, which however must await closing of contacts R—16d. This will not occur until R—16 is energized by a depression of the rewind key RW (Fig. 16a). Thus, tape T—a now remains in its final forward or fully wound position while the fourth paragraph of the letter is being transcribed from tape T—b.

At the end of the fourth paragraph, 17 (T—b), an "end of paragraph" code is sensed, causing energization of code translating coil R—33. Contacts 33b close to form the circuit of coil R—17 (Fig. 16a). Coil R—17 opens contacts R—17d in the stick circuit of coil R—35 (Fig. 16b), and opens contacts R—17a in the circuit of coils MCR—9. Coils MCR—9, being deenergized, contacts MCR—9c close to permit coils MCR—3 and MCR—4 (Fig. 16b) to make. Also contacts MCR—9b open to break the circuit of coil R—14 (Fig. 16a), which permits contacts R—14a' to open and contacts R—14a (Fig. 16b) to close and transfer feed of tape T—b from the read clutch to the find clutch of unit B.

When the "end of paragraph" code passes brushes F of unit B, coil R—17 is deenergized and before contacts R—17d can close, the main circuit of coil R—35 is broken by the opening of contacts R—33a.

Coil R—35, being deenergized, contacts 35b open to deenergize coils MCR—5 (Fig. 16b.)

Tape T—b is now fed by the find shaft 67 in a reading direction until front paper roll contacts PC—f of unit B open. This breaks the find clutch circuit and the read brush circuit (Fig. 16b) of unit B. The brushes F of the latter unit rise, causing brush holder contacts BC—F of the unit to close, ready to complete the rewind circuits of unit B (Fig. 16b) when the rewind key is depressed.

Thus, after the four paragraphs of the letter have been typed under alternate control of tapes T—a and T—b, both tapes are in their furthest advanced position in the reading direction, ready to be rewound.

To type a second letter under control of the same paragraphs 8 (T—a), 4 (T—b), 15 (T—a), and 17 (T—b), the setting of the dials D—1 to 4 is left alone. A new letter sheet is inserted, the preliminary matter typed in, and then rewind key RW depressed. This establishes the R—30 and R—31 coils circuit (Fig. 16a). Coil R—30 opens contact R—30b to break the holding circuit of coil R—15 (Fig. 16a).

Coil R—31 closes contacts R—31b and R—31c to reestablish the circuits of coils R—16 and R—17 (Fig. 16a). Coils R—19 and R—20 are still energized to respectively close contacts R—19b and R—20b and when contacts R—16d and R—17e close, the circuits of units A and B rewind coils R—25 and MCR—6 (Fig. 16b) are formed. Contacts R—25 close to reestablish the rewind brush and clutch circuit of unit A and contacts MCR—6a close to re-form the rewind brush and clutch circuit of unit B. The various operations described with respect to the first letter are then repeated.

While the invention has been disclosed in connection with the illustrated and described form, it is understood that variations, departures from the form, and changes may be effected without departing from the principles of the invention. It is therefore intended to be limited as indicated by the following claims.

We claim:

1. In combination; a plurality of record sheets, each with a plurality of record forms bearing coded data, means for effecting a preliminary, variable selection of a series of forms from the plurality of record sheets, means for decoding the data of the series of preliminarily selected forms, one form after another, and means to prevent decoding of any selected form of the series before a preceding selected form has been decoded.

2. In combination; a plurality of separate record form supplies, each with a plurality of record forms bearing coded data, means for effecting a preliminary, variable selection of a series of forms from the plurality of supplies, means for decoding the data of the series of preliminarily selected forms, one form after another, and means to prevent decoding of any selected form of the series before a preceding, selected form of the series has been decoded.

3. In a machine of the class described; a plurality of separate supplies of record forms bearing item designations, a plurality of variably settable form selecting devices for preliminarily choosing a series of forms from the separate supplies, each device to make a preliminary choice of a different one of said forms, means under control of and in accordance with the setting of said devices for effecting selection of the series of the preliminarily chosen forms to control the machine, and means for constraining the chosen forms of the series to effect control of the machine in predetermined order in accordance with the item designations of the selected forms.

4. In combination; a plurality of record sheets, each with a plurality of record forms bearing designations, electrical means, including circuits with selective manual contact means, for effecting a variable selection of a series of forms from the plurality of sheets, means for reading out the equivalents of the designations of the series of selected forms, one form after another, and means to prevent reading out of one form of the series before the preceding form of the series has been read out.

5. In combination; means operable in accordance with data designations, a plurality of record sheets bearing designations, means conditioned in accordance with which sheet is in active control of the first-named means for calling another sheet into control, and means controlled by a special designation on the active sheet, and which designation is the same irrespective of which sheet is being called, for initiating operation of the aforesaid calling means.

6. In combination; a plurality of record sheets, each with a plurality of successive record forms bearing designations, means for selecting forms from the sheets and including means concurrently feeding the different sheets for calling to a separate control position a form from each of a plurality of the sheets, and means for converting the designations of said positioned forms, one selected form after another, into equivalents.

7. In combination; a plurality of record sheets, each with a plurality of record forms bearing designations, means for converting the designations of a form of one of the sheets into equivalents, and means operable while the designations of one form of one sheet are being converted for conditioning a form from another sheet for subsequent control of the converting means.

8. In combination; a plurality of record sheets, each with a plurality of record forms bearing designations, means for reading out the designations of a form of one sheet, means operable while one sheet form is being read out for readying a form from another sheet to be read out, and means for delaying the reading out of the latter selected form until the reading out of the previous form is completed.

9. In combination; a plurality of record sheets bearing designations, means for translating designations of the sheets, one sheet at a time, means to shift control of the translating means from one sheet to another, means operative upon completion of the translation of designation of one sheet for calling said shifting means into operation, and means for determining the order in which the sheets are to be shifted into control of the translating means, irrespective of any designation or designations of said sheets.

10. In a machine of the class described; a typewriter unit; a record sheet having a plurality of record forms bearing item designations, a plurality of manual form selecting means, each selecting means capable of selecting a different form from said sheet, and means for automatically and successively causing the different forms selected by said selecting means to control the typewriter unit in accordance with the item designations of the selected forms.

11. In a machine of the class described; a record tape having a plurality of record forms bearing data designations, each form also having its own peculiar identifying designation, a preliminary selecting means for variably and preliminarily choosing a plurality of differently identified forms of said tape to control said machine in succession in accordance with the coded designations of the chosen forms, and means jointly controlled by form identifying designations corresponding to the chosen forms and by the preliminary choosing means for selectively feeding the record tape to bring the chosen forms in succession to position for controlling said machine in accordance with their data designations.

12. In a machine of the class described; a plurality of data-designating forms having a common feed path through the machine, means for reading out the data designations of the forms, selecting means variably to select different forms to be read out, including preliminarily settable means having a plurality of settings to choose preliminarily a plurality of different ones of said forms to be selected and means automatically operative and attendant upon completion of the reading out of one of the selected forms for initiating selection by said selecting means of another different form to be subsequently read out.

13. In a machine of the class described; a plurality of record forms bearing item designations and having a common feed path through the machine, a plurality of variably settable form selecting devices preliminarily settable to choose, preliminarily, a plurality of said forms, each device to make a preliminary choice of a different one of said forms, means under control of and in accordance with the preliminary setting of said devices for effecting selection of the plurality of preliminarily chosen forms to control the machine, and means for constraining the plurality of preliminarily selected forms to effect control of the machine in predetermined order in accordance with the item designations of the selected forms.

14. In a machine of the class described; a plurality of record sheets, each with a plurality of record forms bearing designations, devices controlled by one form at a time to control operation of the machine in accordance with the designations of the form, means effective upon completion of the control of the devices by one form of a sheet for initiating control of the devices by a form from another sheet, and means simultaneously effective with the first-mentioned means for initiating selection of still another form to subsequently control machine operation.

15. In a machine of the class described; a pair of record sheets, each with a plurality of record forms bearing designations, devices controlled by one form at a time to operate the machine in accordance with the designations of the form, means effective upon completion of the control of the devices by the form of a first one of the sheets for initiating control of the devices by a form from the second sheet, and means simultaneously effective with the first-named means to initiate selection of another form from the first sheet to follow the form of the second sheet in controlling said devices.

16. In a machine of the class described; a record sheet having a plurality of record forms bearing data designations and each form also having its own form identifying characteristic, and means under control of different form identifying characteristics for effecting in automatic succession a selection of a plurality of differently identified forms from the sheet for controlling the machine in accordance with the data designations of the selected forms.

17. In a machine of the class described; a data transcribing unit, a plurality of record sheets, each with a plurality of record forms bearing data designations, a plurality of selecting devices, one for each sheet to select the first form of the sheet, a plurality of additional selecting devices, one for each sheet to select the second form of the sheet, and means for controlling operation of the transcribing unit under successive control of the forms of the different sheets selected by the first-mentioned devices and then under successive control of the forms of the sheets selected by the second-mentioned devices.

18. In a machine of the class described; a data transcribing unit, a pair of record sheets, each with a plurality of data designation-bearing forms, a plurality of manual selecting devices for each sheet preliminarily to select forms of the sheet, means for selecting the forms of each sheet under successive control of the devices for the sheet, and means controlled alternately by the different selected forms of a pair of sheets, by one form of a sheet after a form of the other sheet, for governing operation of the transcribing unit in accordance with the designations of the selected forms.

19. In a machine of the class described; a transcribing apparatus, a plurality of data designation-bearing forms having a common feed path through the machine, each form also bearing its own form identifying designation, means for effecting selection of a plurality of differently identified forms under control of their own different identifying designations, and means controlled in automatic succession by said selected forms for controlling operation of the apparatus to successively transcribe the data designations of the selected forms.

20. In a machine of the class described; recording apparatus, a plurality of data sources, each having a plurality of successive forms bearing coded data representations, means including manual form choosing devices, for variably selecting a series of forms including a plurality of successive forms from each source preliminarily chosen by said devices, translating means controlled by the series of selected forms in predetermined succession for operating the recording apparatus to record the data corresponding to the coded data designations of the selected forms, and means for automatically interrupting control of the recording apparatus by the translating means after the data designated on the last form of a selected series has been recorded.

21. In a machine of the class described; a plurality of record forms having index positions which may be perforated to represent either data designations or form identifying designations, each record form bearing such data designations and one form identifying designation, means for analyzing the designations, means for moving the forms at a relatively high speed through the analyzing means during selection of a form, means controlled by the identifying designation of a form for selecting the latter form during high speed movement of the forms, and means acting after the selection of a form for sending the selected form through the analyzing means at a lower speed to have its data designations analyzed by said analyzing means.

22. In a machine of the class described; a record strip bearing data and classifying designations, means for moving the strip in either of opposite directions, sensing means for sensing the strip designations while the strip is moving in one direction, other sensing means for sensing the strip designations while moving in the opposite direction, and means controlled by either sensing means upon sensing a selected classifying designation for preparing one said sensing means for effectively sensing the data designations.

23. In a machine of the class described; a record strip bearing designations, means for feeding the strip in a forward direction, means for feeding the strip in a reverse direction, a set of sensing elements for sensing the designations of the strip during its forward movement, another set of sensing elements for sensing the designations of the strip during its reverse movement, means for conditioning the sets of sensing elements in operation one at a time and simultaneously setting the feeding means in operation for feeding the strip in the direction in which the operatively conditioned sensing set is effective to sense the designations, and means controlled by either effective set of sensing elements upon sensing a selected designation for preparing the strip for forward movement.

24. In combination, a transcribing apparatus, a plurality of record forms, each with successive character representations and with its own peculiar distinguishing characteristic, means to choose preliminarily and variably a plurality of said forms to be selected for transcription, means jointly controlled by the choosing means and by the distinguishing characteristics of the chosen forms for bringing the chosen forms, along a common feed path, successively to a common control position, and means controlled by the character representations of the latter forms for causing the transcribing apparatus to transcribe these character representations successively and one at a time.

25. In combination, means to read out character representations, a plurality of record forms of promiscuous lengths, each form with its own peculiar distinguishing representation followed by character representations, means to choose variably and preliminarily a plurality of forms to be read out, an analyzing unit for analyzing the forms, one at a time, for representations and being effective to analyze the distinguishing representation of a form before analyzing the character representations thereof, means for feeding said forms successively along a common path through said analyzing means, means jointly controlled by the preliminary choosing means and by the analyzing unit upon analyzing the distinguishing representations of the chosen forms for carrying into effect selection in automatic succession of the chosen forms, and means controlled in accordance with analysis by the analyzing unit of the character representations of the selected forms for operating the read out means to read out their character representations.

26. In combination, means to read out character representations, a plurality of record forms, each with its own peculiar distinguishing representation followed by lines of character representations, means to choose variably and preliminarily a form to be read out, a line of analyzing elements, some common to and arranged to coact either with the distinguishing or the character representations, to successively analyze the distinguishing representation of a form and then its lines of character representations, means jointly controlled by the preliminary choosing means and by the analyzing elements upon analyzing the distinguishing characteristic of the chosen form for carrying into effect selection of the latter form, and means controlled by subsequent and successive analysis by the analyzing elements of the lines of character representations of the selected form for operating the read out means to read out the latter character representations.

27. In combination, a transcribing apparatus, a plurality of record forms, each with its own identifying characteristic and with data representations, means for reading out the data representations of a form into the transcribing apparatus to be transcribed successively, means to choose preliminarily and variably a form to be transcribed, selecting means jointly controlled by the choosing means and the identifying characteristic of a chosen form for preparing the reading out means to read out the data representations of the latter form into the transcribing apparatus, and means conditioned upon completion of the reading out of another form for rendering the read out means, after being prepared under control of the form selecting means, completely effective to read out the character representations of the aforesaid chosen form into the transcribing apparatus.

28. In combination, a transcribing unit, a plurality of record forms, each with its own identifying characteristic and with character representations, means for reading out the character representations into the transcribing unit to be transcribed successively, means for variably and preliminarily choosing forms to be transcribed, means for feeding the forms at high speed, means for alternatively feeding the forms at low speed, selecting means jointly controlled, during high speed feed of the forms, by the preliminary choosing means and the identifying characteristic of a chosen form for simultaneously interrupting the feed of the forms by the high speed feed means, initiating transfer of the feed to the low speed feed means, and preparing the reading out means to read out the character representations of the latter form into the transcribing apparatus, and means effective upon completion of the transcribing of a previously chosen form for completing the previously initiated transfer of the feed to the low speed feed means and simultaneously rendering the reading out means completely effective to read out the subsequently chosen form into the transcribing unit.

29. In a machine of the class described; a typewriter unit, a record tape having a plurality of successive record forms bearing item designations, and each form also having a different form identifying designation, a plurality of manual form choosing means for preliminarily choosing a plurality of forms of said tape, each choosing means for individually choosing a different successive form from said tape, means controlled jointly by the choosing means and the different identifying designations for selecting forms preliminarily chosen by said choosing means for control of the typewriter unit, and means for causing the different forms selected by said selecting means to successively control the typewriter unit in accordance with the item designations of the selected forms.

30. In a machine of the class described; a writing unit, a record tape having a plurality of records bearing data designations, selecting means for variably selecting a plurality of records of said tape, and including a plurality of choosing means for preliminarily choosing the plurality of the records to be selected, means for causing the records selected by said selecting means to control the writing unit in accordance with their data designations, and means automatically acting after one of the selected records has controlled the writing unit for initiating selection of the next preliminarily chosen record.

LAURENCE S. HARRISON.
EDWARD J. RABENDA.